United States Patent [19] | [11] Patent Number: 4,741,913
Satake | [45] Date of Patent: May 3, 1988

[54] WHEAT FLOURING PROCESS

[75] Inventor: Toshihiko Satake, Higashihiroshima, Japan

[73] Assignee: Satake Engineering Co., Ltd., Tokyo, Japan

[21] Appl. No.: 873,680

[22] Filed: Jun. 12, 1986

[30] Foreign Application Priority Data

Sep. 30, 1985 [JP] Japan ................................ 60-218969
Oct. 14, 1985 [JP] Japan ................................ 60-229627

[51] Int. Cl.⁴ ................................................ A23P 1/00

[52] U.S. Cl. .................................... 426/483; 426/507; 426/622

[58] Field of Search ............... 426/482, 483, 507, 622; 99/518, 519, 520, 525, 528, 602, 605, 613

[56] References Cited

U.S. PATENT DOCUMENTS

| | | | |
|---|---|---|---|
| 2,745,748 | 5/1956 | McCashen | 426/622 |
| 3,717,480 | 2/1973 | Guichard et al. | 426/482 |
| 4,133,257 | 1/1979 | Satake | 99/518 |

*Primary Examiner*—George Yeung
*Attorney, Agent, or Firm*—Henry Sternberg; Bert J. Lewen

[57] ABSTRACT

A pretreatment system for wheat to be floured comprises a plurality of friction type wheat polishing machines disposed in series relation to form a continuous wheat polishing process line. Each polishing machine includes a perforated tubular polishing member mounted on a frame and a frictionally polishing roll rotatably mounted on the frame. The polishing roll is disposed with the polishing member and cooperates therewith to define therebetween a polishing chamber. Upon the rotation of the polishing roll, it causes wheat grains supplied into the polishing chamber to be agitated and brought into frictional contact with each other to strip a pericarp from each wheat grain, to thereby polish the same. A moisture supplying device supplies moisture to the polishing chamber of at least one of the polishing machines, to add the moisture to the wheat grains flowing within the polishing chamber, to thereby increase a frictional contact force between the wheat grains. The friction between the wheat grains by the polishing roll causes each wheat grain to be moisturized and softened, to thereby facilitate the stripping of the pericarp from each wheat grain and the exposure of an endosperm part thereof. A wheat flouring system comprises the above pretreatment system and a milling and screening system. The milling and screening system comprises at least one milling machine for milling the wheat grains each having the endosperm part exposed to form a powder material, and at least one screening machine for screening the powder material to provide wheat flour having a desired particle size.

20 Claims, 13 Drawing Sheets

WHEAT FLOURING PROCESS

BACKGROUND OF THE INVENTION

1. Field of the Invention

The present invention relates to a system for pretreating wheat to be floured to remove pericarp from each wheat grain, to thereby expose an endosperm part thereof. The present invention relates also to a process for flouring wheat and a system for carrying out the process.

The term "wheat" used throughout the description of the specification and the appended claims is intended to include "wheat" or "rye".

2. Related Art Statement

In general, a pretreatment of wheat to be floured includes, in addition to the removal of dusts, impurities, pebbles and the like, drying or humidifying the wheat temporarily stored in a storage bin, silo or the like to temper the wheat of the same lot so as to have a uniform moisture content, and increasing the moisture content of the wheat by 0.25%-0.5% 30 minutes to 2 hours prior to a milling treatment thereof by means of a rolling machine, to bring the moisture content of a gluten part of each wheat grain to a level slightly higher than that of an endosperm part thereof so that separation of the gluten part from the endosperm part is facilitated and the gluten part is prevented from being finely pulverized.

Subsequently, the wheat is milled by the rolling machine to form flour. It is impossible to completely remove the endosperm part from each wheat grain by only one pass of the wheat through the rolling machine, and it is usually necessary to pass the wheat through the rolling machine four to seven times. The first pass is referred to as a first breaking and the succeeding passes are referred to as a second breaking, a third breaking, and so on. The material milled at each breaking is sorted by a screen such that the milled material remaining on the screen is fed to the subsequent breaking, while the milled material having passed through the screen is further pulverized.

Based on such characteristics that the affection of the pressure milling by the rolls to the endosperm part of each wheat grain at each breaking is slightly higher than that to the pericarp of the wheat grain so that the endosperm part of each wheat grain is brought to a slightly finer particulate material, the milled material is sorted by the screen to collect the endosperm parts as flour. In this manner, the milled material is sorted by the screen at each breaking and the milled material remaining on the screen is successively subjected to the succeeding breakings, to thereby extract the endosperm parts as the flour.

The percentage of the pericarp of each wheat grain to the endosperm part thereof is in general 12 to 17%, although the composition of the wheat differs depending upon the kind of the wheat or the place of production, and although the value of the percentage differs depending upon the classification as to which of the pericarp or the endosperm part of each wheat grain the aleuron layer at the boundary between the pericarp and the endosperm part belongs. Accordingly, should the pericarp and endosperm part of each wheat grain be completely separated from each other, the yield of the wheat would be 83-88%. However, the average yield by the conventional wheat flouring processes and systems is only 73-78%.

In order to improve the yield of wheat flour of a high quality, it is necessary to strip and remove the endosperm part of each wheat grain out of the pericarp thereof while maintaining the endosperm part to a coarse particle as far as possible. In addition, in order to strip and remove the endosperm part from the pericarp while maintaining the endosperm part to the coarse particle, it is desirable to treat the wheat with a less number of breakings, but third to fourth breakings are usually required. However, as the milled material broken at the breaking is sorted by the screens, the particles remaining on the screens are successively milled at the subsequent breaking and it is repeated at the fourth to seventh breakings to strip the endosperm part left adhering to the pericarp from the pericarp, the particle size of the milled material is gradually reduced so that the gluten part and the endosperm part of each wheat grain resemble each other in property or characteristic and the percentage is increased by which the pericarp particles are mixed in particles to be extracted as the endosperm parts with the pericarp particles having the same size as the particles to be extracted, thereby deteriorating the quality of the wheat flour. Accordingly, in order to produce a high quality wheat flour at a high yield, a skilled technique is required for the determination of the surface configuration of the rolls used in the breakings, the setting of the optimum gap between the rolls which is optimum for each breaking and the setting of the operating conditions of the rolls.

As described above, it is impossible for the conventional flouring techniques to completely separate the peicarp and the endosperm part of wheat grain from each other. In addition, should the yield of the flouring be increased, the quality of the wheat flour would be deteriorated and, inversely, should the quality be improved, the yield would be reduced.

Japanese patent publication No. 29-7620 published for opposition purposes on Nov. 29, 1954 discloses a friction type wheat polishing machine which comprises an auger including one or more first blade fixedly mounted on a shaft for forcibly delivering wheat grains helically, a pair of second blades fixedly mounted on the shaft for successively divide the wheat grain flow forcibly delivered helically, into discrete mass portions, and a third blade mounted on the shaft for mixing the divided mass portions with each other.

Japanese patent publication No. 30-7159 published for opposition purposes on Oct. 7, 1955 discloses a wheat polishing system which comprises a friction type wheat polishing machine, an agitating machine for adding water to the wheat grains to be fed to the friction type wheat polishing machine and for mixing the same, and a grinding machine for grinding the wheat grains discharged from the friction type wheat polishing machine.

Japanese patent publication No. 33-64 published for opposition purposes on Jan. 11, 1958 discloses a wheat polishing system which comprises a grinding type wheat polishing machine, a polishing type bran removing machine for polishing wheat grains discharged from the grinding type wheat polishing machine to remove bran from the wheat grains, an agitating machine for agitating wheat grains discharged from the polishing type bran removing machine while adding water to the wheat grains, a friction type wheat polishing machine for polishing wheat grains discharged from the agitating machine, and a polishing type bran removing machine for removing bran from each wheat grain discharged from the friction type wheat polishing machine. The wheat grains discharged from the last polishing type bran removing machine are returned to the first grinding type wheat polishing machine by means of an elevator.

Japanese Utility Model publication No. 32-14752 published for opposition purposes on Nov. 20, 1957 discloses a water adding machine which comprises a water supplying chamber, a nozzle for supplying water to the water supplying chamber, and a pair of agitating blades fixedly secured to a shaft rotatably disposed in the water supplying chamber. As the shaft is rotated, the agitating blades cooperate with an inner surface of a wall defining the water supplying chamber to agitate the wheat grains under friction while water from the nozzle is being supplied thereto.

Applicant is aware of the following U.S. patents which disclose a polishing machine with humidifier. It is to be noted, however, that these U.S. patents are directed to the treatment of rice, but not wheat:

U.S. Pat. No. 4,133,257 issued on Jan. 9, 1979 to Toshihiko Satake;

U.S. Pat. No. 4,148,251 issued on Apr. 10, 1979 to Toshihiko Satake;

U.S. Pat. No. 4,155,295 issued on May 22, 1979 to Toshihiko Satake;

U.S. Pat. No. 4,323,006 issued on Apr. 6, 1982 to Toshihiko Satake; and

U.S. Pat. No. 4,488,481 issued on Dec. 18, 1984 to Toshihiko Satake.

OBJECT AND SUMMARY OF THE INVENTION

An object of the present invention is to provide a pretreatment system for wheat to be floured wherein pericarp is removed from each wheat grain to expose endosperm parts thereof in a substantially complete form, to allow the endosperm parts to be milled by a subsequent step to thereby enable wheat flour of a high quality to be produced at a high yield.

Another object of the present invention is to provide a process for flouring wheat, which is capable of producing wheat flour of a high quality at a high yield.

A further object of the present invention is to provide a system for carrying out the process.

According to the present invention, there is provided a pretreatment system for wheat to be floured, comprising:

a plurality of friction type wheat polishing machines disposed in series relation to form a continuous wheat polishing process line, each of the polishing machines comprising a frame, a perforated tubular polishing member mounted on the frame, a frictionally polishing roll rotatably mounted on the frame so as to have an axis substantially coincident with an axis of the perforated tubular polishing member, the polishing roll cooperating with the perforated tubular polishing member to define therebetween a polishing chamber, means for feeding the wheat to be polished into the polishing chamber, means for rotating the frictionally polishing roll relative to the perforated tubular polishing member, the rotation of the frictionally polishing roll relative to the perforated tubular polishing member causing the wheat grains fed into the polishing chamber to be agitated to cause the wheat grains to be brought into frictional contact with each other, to thereby strip a pericarp from each wheat grain to polish the same, and the polished wheat grains being allowed to be discharged out of the polishing chamber and the stripped pericarps being allowed to be discharged out of the polishing chamber through the apertures in the perforated tubular polishing member, the wheat grains discharged out of the polishing chamber of one of each pair of adjacent friction type wheat polishing machines being introduced into the polishing chamber of the other friction type wheat polishing machine; and moisture supplying means communicating with the polishing chamber of at least one of the plurality of friction type wheat polishing machines for supplying moisture into the polishing chamber to add the moisture to the individual wheat grains flowing within the polishing chamber to increase a frictional contact force between the wheat grains, to thereby cause the frictional contact of the wheat grains with each other by the friction polishing roll of the at least one friction type wheat polishing machine to moisturize and soften the entire pericarp of each wheat grain, to facilitate the stripping of the pericarp from each wheat grain and the exposure of an endosperm part of each wheat grain.

According to the present invention, there is further provided a process of flouring wheat, comprising:

the step of preparing a plurality of friction type wheat polishing machines disposed in series relation to form a continuous wheat polishing process line, each of the polishing machines comprising a frame, a perforated tubular polishing member mounted on the frame, a frictionally polishing roll rotatably mounted on the frame so as to have an axis substantially coincident with an axis of the perforated tubular polishing member, the polishing roll cooperating with the perforated tubular polishing member to define therebetween a polishing chamber, means for feeding the wheat to be polished into the polishing chamber, means for rotating the frictionally polishing roll relative to the perforated tubular polishing member, the rotation of the frictionally polishing roll relative to the perforated tubular polishing member causing the wheat grains fed into the polishing chamber to be agitated to cause the wheat grains to be brought into frictional contact with each other, to thereby strip a pericarp from each wheat grain to polish the same, and the polished wheat grains being allowed to be discharged out of the polishing chamber and the stripped pericarps being allowed to be discharged out of the polishing chamber through the apertures in the perforated tubular polishing member, the wheat grains discharged out of the polishing chamber of one of each pair of adjacent friction type wheat polishing machines being introduced into the polishing chamber of the other friction type wheat polishing machine;

the step, associated with at least one of the friction type wheat polishing machines, of supplying moisture into the polishing chamber of the friction type wheat polishing machine to add the moisture to the individual wheat grains flowing within the polishing chamber to increase a frictional contact force between the wheat grains, to thereby cause the frictional contact of the wheat grains with each other by the frictionally polishing roll of the at least one friction type wheat polishing machine to moisturize and soften the entire pericarp of each wheat grain, to facilitate the stripping of the pericarp from each wheat grain and the exposure of an endosperm part of each wheat grain;

the step of milling the wheat grains each having the endosperm part exposed, to form a powder material; and the step of screening the powder material to provide a flour having a desired particle size.

According to the present invention, there is further provided a system for flouring wheat, comprising:

a pretreatment system comprising: a plurality of friction type wheat polishing machines disposed in series relation to form a continuous wheat polishing process line, each of the polishing machines comprising a frame, a perforated tubular polishing member mounted on the frame, a frictionally polishing roll rotatably mounted on the frame so as to have an axis substantially coincident with an axis of the perforated tubular polishing member, the polishing roll cooperating with the perforated tubular polishing member to define therebetween a polishing chamber, means for feeding the wheat to be polished into the polishing chamber, means for rotating the frictionally polishing roll relative to the perforated tubular polishing member, the rotation of the frictionally polishing roll relative to the perforated tubular polishing member causing the wheat grains fed into the polishing chamber to be agitated to cause the wheat grains to be brought into frictional contact with each other, to thereby strip a pericarp from each wheat grain to polish the same, and the polished wheat grains being allowed to be discharged out of the polishing chamber and the stripped pericarps being allowed to be discharged out of the polishing chamber through the apertures in the perforated tubular polishing member, the wheat grains discharged out of the polishing chamber of one of each pair of adjacent friction type wheat polishing machines being introduced into the polishing chamber of the other friction type wheat polishing machine; and moisture supplying means communicating with the polishing chamber of at least one of the plurality of friction type wheat polishing machines for supplying moisture into the polishing chamber to add the moisture to the individual wheat grains flowing within the polishing chamber to increase a frictional contact force between the wheat grains, to thereby cause the frictional contact of the wheat grains with each other by the frictionally polishing roll of the at least one friction type wheat polishing machine to moisturize and soften the entire pericarp of each wheat grain to facilitate the stripping of the pericarp from each wheat grain and the exposure of an endosperm part of each wheat grain, and a milling and screening system comprising: at least one milling matching for milling the wheat grains each having the endosperm part exposed, supplied from the pretreatment system, to form a powder material; and at least one screening machine for screening the powder material to provide flour having a desired particle size.

DETAILED DESCRIPTION OF THE PREFERRED EMBODIMENTS

Figure 1:
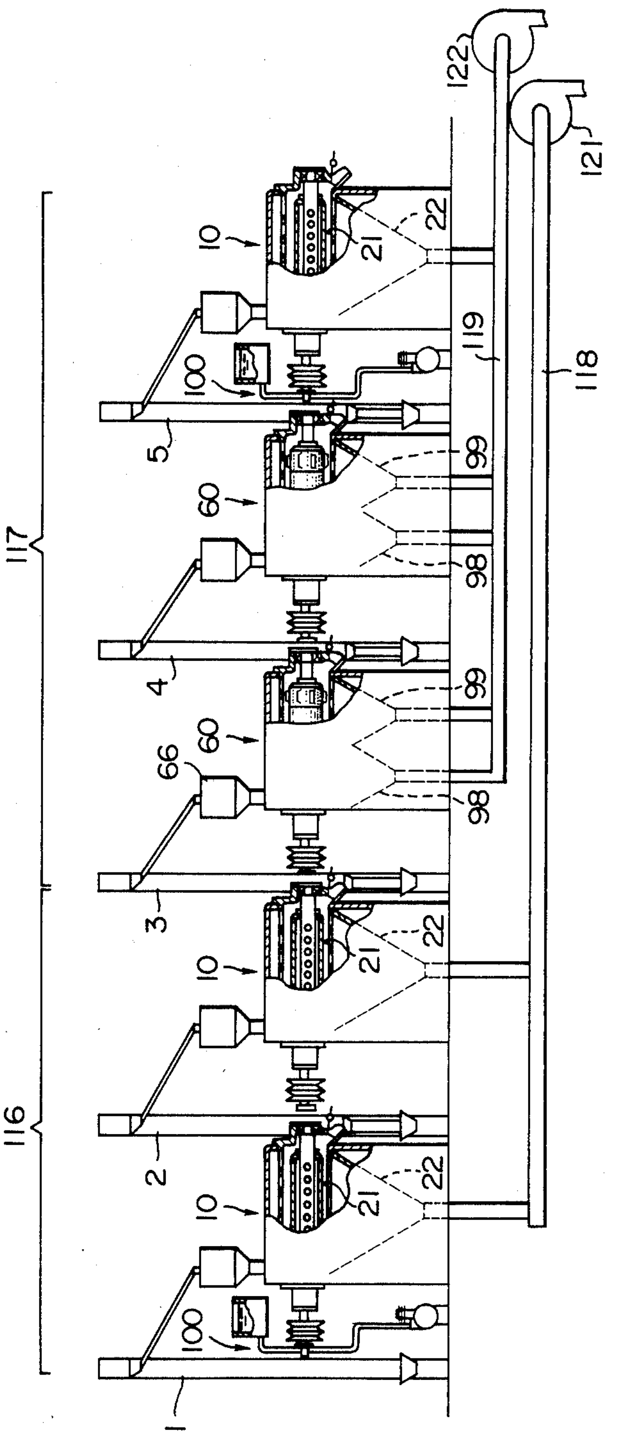
FIG. 1 is a schematic view showing an entire pretreatment system in accordance with an embodiment of the present invention.

Referring to FIG. 1, a system for pretreating wheat to be floured, in accordance with an embodiment of the present invention, comprises a plurality of friction type wheat polishing machines 10 disposed in series relation, and two grinding type wheat polishing machines 60 disposed in series relation between the second and last friction type wheat polishing machines 10. An elevator 1 delivers the wheat to be floured to the first wheat polishing machine 10, and a corresponding one of elevators 2, 3, 4 and 5 delivers the wheat discharged from one of each pair of adjacent wheat polishing machines to the other wheat polishing machine, to thereby form a continuous wheat polishing process line. at least one of the plurality of friction type wheat polishing machines 10 (each of the first and last wheat polishing machines 10 for the illustrated embodiment) has associated therewith a moisture supplying device 100.

Figure 2:
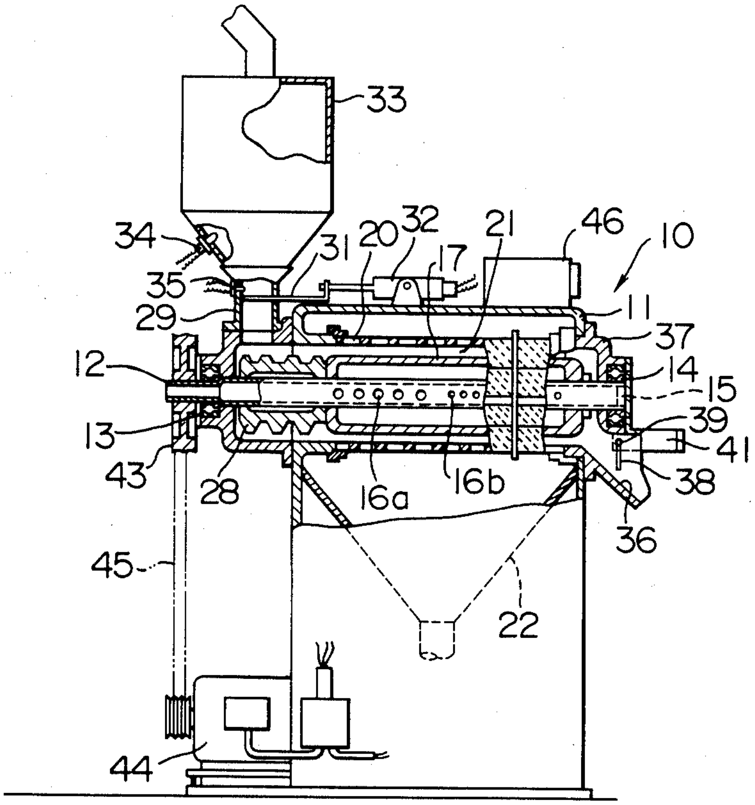
FIG. 2 is a partially cross-sectional, side elevational view showing a friction type wheat polishing machine illustrated in FIG. 1.
Figure 3:
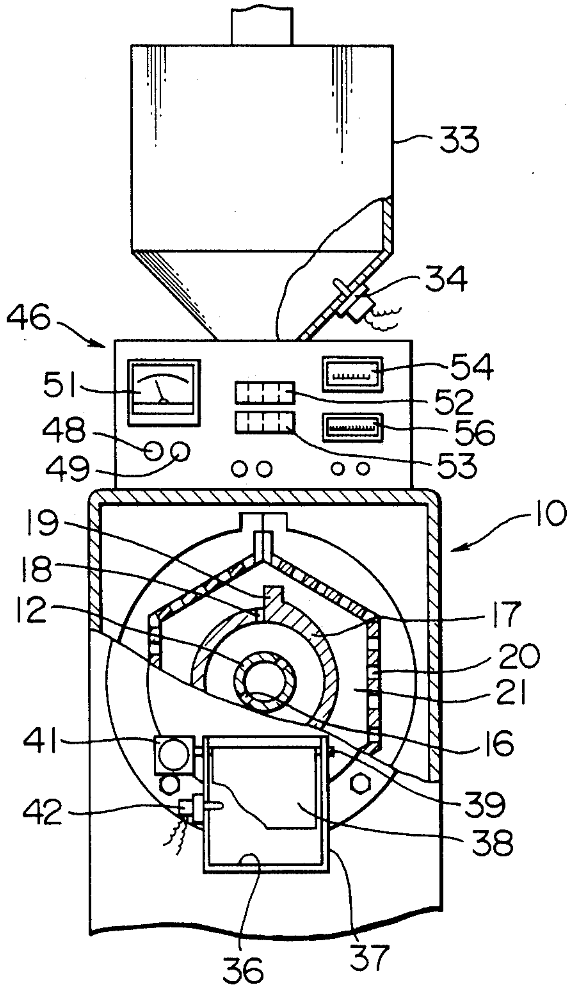
FIG. 3 is a partially cross-sectional, fragmentary front elevational view showing the friction type wheat polishing machine illustrated in FIG. 2.

As shown in FIGS. 2 and 3, each of the friction type wheat polishing machines 10 has a frame 11. A hollow shaft 12 is rotatably mounted on the frame 11 by bearings 13 and 14 for rotation about a substantially horizontal axis. The hollow shaft 12 has therein a hollow portion which has one end thereof opening at an end face of the shaft 12 and the other end closed by a plug 15, and has a wall having formed therein a plurality of relatively large bores **16*a* and a plurality of relatively small bores 16*b*, which are in communication with the hollow portion. A frictionally polishing roll 17 is mounted on the hollow shaft 12 for rotation therewith so as to have an axis extending in substantially concentric relation to the hollow shaft 12. The frictionally polishing roll 17 is hollow and has a wall provided therein with a pair of diametrically opposed, longitudinal slots 18 (FIG. 3). An agitating projection 19 extends along each slot 18. A perforated tubular polishing member 20 having a polygonal cross-section is mounted on the frame 11 so as to have an axis extending in substantially concentric relation to the hollow shaft 12. The perforated tubular polishing member 20 cooperates with the frictionally polishing roll 17 to define therebetween a polishing chamber 21. The hollow portion in the hollow shaft 12 communicates with the polishing chamber 21 through the bores 16***a* and 16*b* in the wall of the hollow shaft 12, the hollow portion in the polishing roll 17 and the slots 18 in the wall of the polishing roll 17. A space around the perforated tubular polishing member 20 is connected to a bran collecting duct 22.

The hollow shaft 12 has axial one end closed by the plug 15 and the other open axial end. By the action of a blower to be described later, air is injected into the polishing chamber 21 through the open axial end of the hollow shaft 12, the hollow portion in the hollow shaft 12 and the bores 16*a* and 16*b* in the wall thereof and the slots 18 in the wall of the polishing roll 17.

A screw feeder 28 is mounted on the hollow shaft 12 for rotation therewith and feeds, upon rotation, the wheat grains delivered through an inlet duct 29, to the polishing chamber 21. A shutter 31 is connected to a pneumatic piston and cylinder assembly 32 and is movable between a closed position shown in FIG. 2 where it closes the inlet duct 29 and an open position where it opens the inlet duct 29. An upper end of the inlet duct 29 is connected to a hopper 33. A temperature sensor 34 attached to the wall of the hopper 33 detects the temperature of the wheat grains within the hopper 33 to issue a signal representative of the temperature. A sensor 35 attached to the inlet duct 29 detects whether the wheat grains exist at a position immediately upstream of the shutter 31, to issue a signal when the wheat grains exist.

An end of the polishing chamber 21 opposite to an end thereof adjacent the screw feeder 28 communicates with a discharge passage 36 formed in an outlet duct 37. A pressure plate 38 disposed in the discharge passage 36 is pivotable around a pivot 39, and is biased in the clockwise direction in FIG. 2 by an adjustable weight 41. As shown in FIG. 3, a temperature sensor 42 provided on the outlet duct 37 detects the temperature of the wheat grains discharged through the discharge passage 36 to issue a signal representative of the temperature.

A grooved pulley 43 is mounted on an extending end of the hollow shaft 12 for rotation therewith. The pulley 43 is rotated by an electric motor 44 through belts 45.

A control unit 46 disposed on the top of the frame 11 has, as clearly shown in FIG. 3, a starting push button 48 for the motor 44, a stopping push button 49 for the motor 44, an indicator 51 for indicating the load applied to the motor 44, an indicator 52 for indicating the temperature detected by the temperature sensor 34, an indicator 53 for indicating the temperature detected by the temperature sensor 42, and an indicator 54 for indicating the torque applied to the pressure plate 38 by the weight 41.

Figure 4:
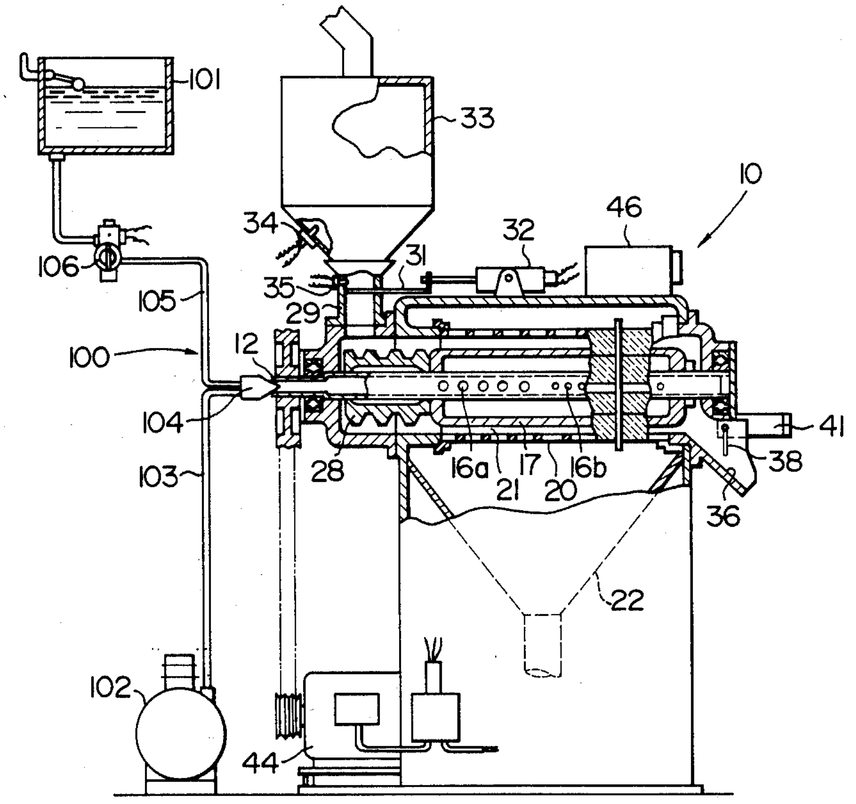
FIG. 4 is an enlarged cross-sectional view of the friction type wheat polishing machine shown in FIG. 1 and having associated therewith a moisture supplying device.

As shown in FIG. 4, the moisture supplying device 100 associated with the friction type wheat polishing machine 10 comprises a tank 101 receiving therein water and an air compressor 102. An air pipe 103 has one end thereof connected to the compressor 102 and the other end connected to a supersonic nozzle 104. The supersonic nozzle 104 is disposed opposite to the axial open end of the hollow shaft 12 of the friction type wheat polishing machine 10 so as to be in communication with the hollow portion in the hollow shaft 12. A water pipe 105 has one end thereof connected to the tank 101 and the other end connected to the nozzle 104. An electromagnetic valve 106 is provided in the water pipe 105 to adjust the flow rate of the water flowing therethrough from the tank 101 to the nozzle 104. The electromagnetic valve 106 is connected to the control unit 46 (FIG. 3) to indicate the flow rate flowing through the water tube 105, on an indicator 56 (cf. FIG. 3) of the control unit 46.

Figure 5:
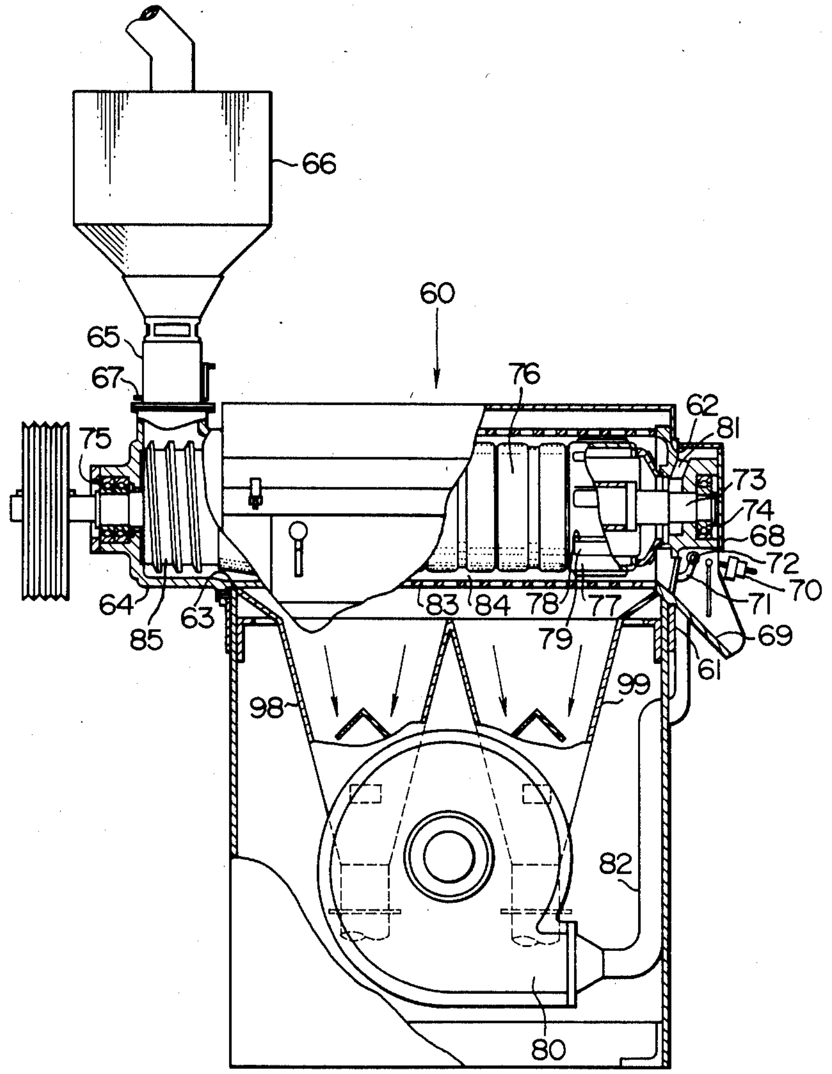
FIG. 5 is a partially cross-sectional, side elevational view showing a grinding type wheat polishing machine illustrated in FIG. 1.
Figure 6:
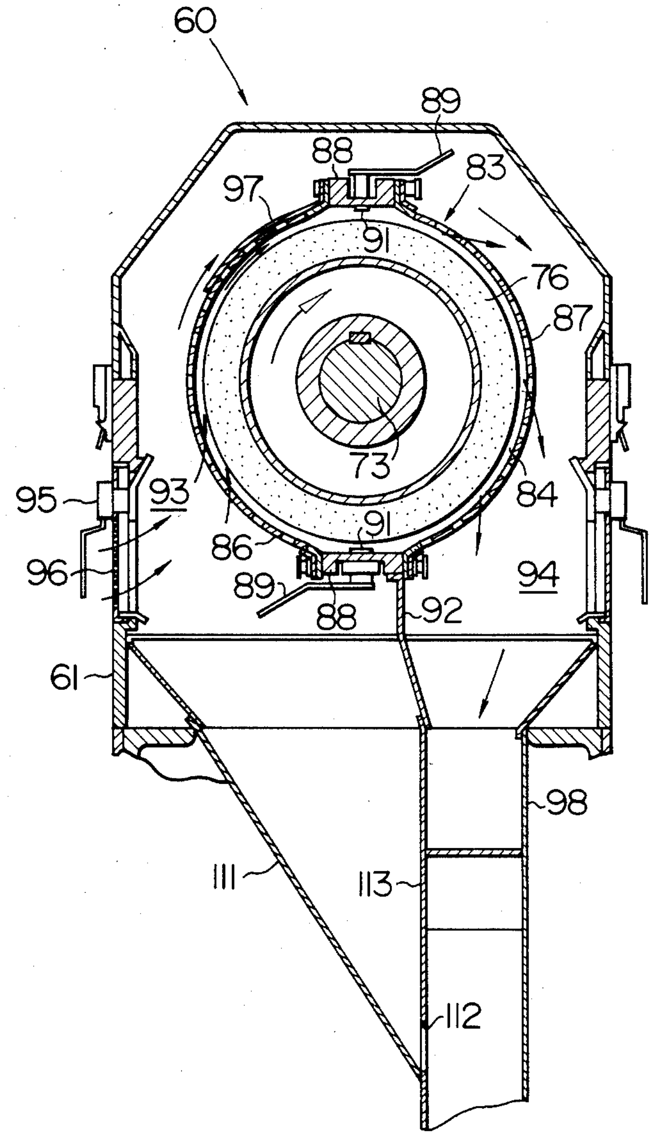
FIG. 6 is a fragmentary cross-sectional view taken along the line VI—VI in FIG. 5.

As shown in FIGS. 5 and 6, each grinding type wheat polishing machine 60 comprises a frame 61 having a front wall provided therein with a front opening 62 and a rear wall provided therein with rear opening 63. An inlet unit 64 fitted in the rear opening 63 has an inlet duct 65 having an upper end connected to a hopper 66. A retractable shutter 67 is movable between a closed position shown in the figure where it closes the inlet duct 65 and an open position where it opens the inlet duct 65. An outlet unit 68 fitted in the front opening 62 defines therein a discharge passage 69. A pressure plate 71 disposed in the outlet passage 69 is pivotable around a pivot 72, and is biased in the clockwise direction in FIG. 5 by an adjustable weight 70.

A shaft 73 having a substantially horizontally extending axis is rotatably supported by a bearing 75 incorporated in the inlet unit 64 and a bearing 74 incorporated in the outlet unit 68. A grinding roll 76 having a plurality of roll sections each of which is formed by the sintering of grindstone particles is mounted on the shaft 73 for ratation therewith. In addition, a polishing roll 77 formed by a metallic surface is mounted on the shaft 73 for rotation therewith with the roll 77 abutting against one end face of the grinding roll 76. The polishing roll 77 is hollow and has a wall provided therein with axially extending slots 78. An agitating claw 79 integrally extending from an outer peripheral surface of the polishing roll 77 extends along the leading edge of the corresponding slot 78 with reference to the rotational direction of the polishing roll 77. The hollow portion of the polishing roll 77 communicates with a high pressure blower 80 through a passage 81 formed in the outlet unit 68 and a duct 82.

A perforated tubular polishing member 83 of a circular cross-section is supported by the inlet and outlet units 64 and 68 so as to have an axis extending in substantially concentric relation to the shaft 73. The perforated tubular polishing member 83 cooperates with the grinding roll 76 and the polishing roll 77 to define therebetween a polishing chamber 84 having an outlet end communicating with the discharge passage 69. A screw feeder 85 mounted on the shaft 73 adjacent an inlet end of the polishing chamber 84 for rotation with the shaft 73 feeds the wheat grains delivered from the hopper 66 through the inlet duct 65, to the polishing chamber 84, upon the rotation of the screw feeder 85.

As clearly shown in FIG. 6, the perforated tubular polishing member 83 comprises a pair of perforated arcuate plates 86 and 87 connected to each other by a pair of connecting bars 88. An actuating rod 89 pivotally mounted on each of the connecting bars 88 actuates a plurality of resisting claws 91 located within the polishing chamber 84, to adjust the angle of the resisting claws 91. A substantially vertically extending partition wall 92 having its top fixedly secured to the lower connecting bar 88 defines a suction chamber 93 to which the perforated arcuate plate 86 is exposed and a discharge chamber 94 to which the perforated arcuate plate 87 is exposed. An access door 95 removably mounted in an opening formed in a side wall of the frame 61 facing to the suction chamber 93 is provided with a plurality of suction apertures 96. An upper portion of the perforated arcuate plate 86 facing to the suction chamber 93 is covered by a shielding plate 97 so that the bran powder removed from wheat grains by the grinding roll 76 and the polishing roll 77 is prevented from flowing through the upper portion of the perforated arcuate plate 86 and being discharged into the suction chamber 93. A lower portion of the discharge chamber 94 is connected to a pair of bran collecting ducts 98 and 99, and a lower portion of the suction chamber 93 is connected to a duct 111 for guiding broken grains such that the broken grains are introduced into the bran collecting ducts 98 and 99 through openings 112 formed in an extension 113 of the partition wall 92.

As shown in FIG. 1, the first and second friction type wheat polishing machines 10 form a front half 116 of the continuous wheat polishing process line, while the last friction type wheat polishing machine 10 and the two grinding type wheat polishing machines 60 form a rear half 117 of the continuous wheat polishing line. The bran collecting duct 22 of each of the wheat polishing machines 10 in the front half 116 are connected to a pneumatic transporting line 118, and the bran collecting ducts 98, 99 and 22 of the wheat polishing machines 60 and 10 in the rear half 117 are connected to a pneumatic transporting line 119. The pneumatic transporting lines 118 and 119 are connected to blowers 121 and 122, respectively.

Operation of the system shown in FIGS. 1–6 will be described below.

Referring to FIGS. 3 and 4, when the sensor 35 detects that the wheat grains to be polished are supplied to the hopper 33 and the detecting signal is supplied to the control unit 46, the pneumatic piston and cylinder assembly 32 is actuated by the output signal from the control unit 46 to move the shutter 31 to the open position thereby allowing the wheat grains to be fed from the inlet duct 29 to the polishing chamber 21 by the screw feeder 28. The electromagnetic valve 106 and the air compressor 102 of the moisture supplying device 100 are actuated by the output signal from the control unit 46 to thereby inject the moisture in the mist form from the supersonic nozzle 104 into the hollow portion of the hollow shaft 112. The injected moisture is jetted into the polishing chamber 21 through the hollow portion of the hollow shaft 12, the bores **16*a* and 16*b*, the hollow portion of the polishing roll 17 and the slots 18 (refer to FIG. 3), by the action of the blower 121, so that the moisture is directly added to the pericarp of each wheat grain flowing in the polishing chamber 21 toward the discharge passage 36, while the wheat grains are brought into frictional contact with each other by the agitating action of the polishing roll 17. The frictional contact of the wheat grains with each other causes the entire pericarp of each wheat grain to be moisturized and softened, to thereby facilitate the stripping of the pericarp from the endosperm part of each wheat grain. The stripped pericarps or bran powder together with the added moisture are discharged through the apertures in the perforated tubular polishing member 20. The wheat grains having stripped therefrom their respective thin pericarp layers flow out through the discharge passage 36. The thickness of the pericarp stripped from each wheat grain can be adjusted by the control of the amount of moisture supplied by the moisture supplying device 100 to the wheat grains flowing in the polishing chamber 21 and by the control of the wheat grain density within the polishing chamber 21 with the force applied to the pressure plate 38 by the weight 41. For each adjustment, the value of the load on the electric motor 44 is indicated by the indicator 51, the temperature of the wheat grains being introduced in the polishing chamber 21 is indicated by the indicator 52, the temperature of the wheat grains flowing out through the discharge passage 36 is indicated by the indicator 53, the amount of moisture supplied into the polishing chamber 21 is indicated by the indicator 56, and the weight value of the weight 41 is indicated by the indicator 54. As shown in FIG. 1, the wheat grains discharged from the polishing chamber 21 of the first friction type wheat polishing machine 10 are introduced into the second friction type wheat polishing machine 10 by the elevator 2, so that each wheat grain having a surface thereof which has been roughened due to the stripping action by the first friction type wheat polishing machine 10 is polished so as to have a smooth surface, while the wheat grains flow through the polishing chamber 21 of the second friction type wheat polishing machine 10 and are discharged from the discharge passage 36. The wheat grains thus having been polished so as to have their respective smooth surfaces are transported by the elevator 3 into the hopper 66 of the first grinding type wheat polishing machine 60** of the subsequent polishing step.

Referring to FIG. 5, the wheat grains fed into the hopper 66 of the first grinding type wheat polishing machine 60 are introduced into the polishing chamber 84 from the inlet duct 65 by the screw feeder 85. The wheat grains introduced into the polishing chamber 84 are brought into contact with the rotating grinding roll 76 to thereby permit the pericarp to be stripped from each wheat grain. Bran powder consisting of the stripped pericarps is discharged through apertures in the perforated cylindrical polishing member 83. The wheat grains flowing in the polishing chamber 84 toward the discharge passage 69 are subjected to the action of the air flow injected into the polishing chamber 84 from the high pressure blower 80 through the duct 82, the passage 81, the hollow portion of the polishing roll 77 and the slots 78 therein, in addition to the agitating action of the polishing roll 77. The agitation action due to the polishing roll 77 and the action of the high pressure air flow injected into the polishing chamber 84 through the slots 78 cause fine powder floatingly adhering to the surface of each wheat grain to be separated and removed therefrom and cause the thus removed fine powder to be discharged into the discharge chamber 94 through the apertures in the perforated tubular wheat polishing member 83.

Referring to FIG. 6, air flowing into the suction chamber 93 through the suction apertures 96 of the access door 95 during the polishing operation by the first grinding type wheat polishing machine 60 flows along the peripheral surface of the perforated tubular wheat polishing member 83 into the bran collecting ducts 98 and 99 and, at the same time, flows also into the polishing chamber 84 through the apertures in the perforated arcuate plate 86 of the polishing member 83. The air flow flowing into the polishing chamber 84 through the apertures in the plate 86 assists the movement of the wheat grains flowing upwardly from the bottom of the polishing chamber 84 to reduce the tendency that the density of the wheat grains at the bottom of the polishing chamber 84 is increased, to thereby uniform the density of the wheat grains over the entire circumference of the polishing chamber 84. This enables the grinding action due to the grinding roll 76 to be effectively applied to the wheat grains, and enables the polishing action to be uniformly applied to the surface of each of the entire wheat grains. The bran powder removed from each wheat grain is discharged into the discharge chamber 94 through the apertures in the perforated arcuate plate 87 by the air flow flowing into the polishing chamber 84. The degree of the polishing action due to the grinding roll 76 and the polishing roll 77 is determined by varying the flow resistance of the wheat grains within the polishing chamber 84 by the adjustment of the weight 70 and the angular adjustment of the resisting claws 91.

Referring to FIG. 1, the wheat grains discharged from the first grinding type wheat polishing machine 60 are introduced into the hopper 66 of the second grinding type wheat polishing machine 60 by the elevator 4. The wheat grains are further polished by the second grinding type wheat polishing machine 60 in a manner substantially the same as that due to the first grinding type wheat polishing machine 60.

Referring to FIGS. 1 and 4, the wheat grains having their respective pericarps removed by the second grinding type wheat polishing machine 60 so as to have an increased polishing degree are supplied into the third, or the last friction type wheat polishing machine 10 by the elevator 5. Moisture is added to the wheat grains introduced into the polishing chamber 21 of the last friction type wheat polishing machine 10, in the same manner as that described with reference to the first friction type wheat polishing machine 10. Thus, the thin surface layer of each wheat grain having been roughened by the grinding action due to the first and second grinding type wheat polishing machines 60 and 60 is softened. In addition, due to the gentle agitating action by the polishing roll 17 of the last polishing machine 10, slightly remaining pericarps on the surfaces of the respective endosperm parts are stripped therefrom, and each wheat grain surface is polished smoothly, to thereby expose the endosperm part of each wheat grain. The bran powder is substantially completely removed from the endosperm parts and is discharged into the bran collecting duct 22. The wheat grains having been subjected to the pretreatment wherein the pericarp is stripped from each wheat grain to expose the endosperm part thereof are transported to a milling system to be described later and are milled thereby.

Referring to FIG. 1, the bran powder discharged from the wheat polishing machines 10 and 10, which form the front half 116 of the continuous wheat polishing process line, through the bran collecting ducts 22 and 22 is transported to any desired place through the transporting line 118 by means of the blower 121. the bran powder discharged from the wheat polishing machines 60, 60 and 10, which form the rear half 117 of the continuous wheat polishing process line, through the bran collecting ducts 98 and 99, 98 and 99 and 22 is transported to any desired place through the transporting line 119 by the blower 122. The bran powder discharged from the front half 116 and the bran discharged from the rear half 117 are reprocessed as a volume increasing agent for breads, biscuits, noodles and the like appropriately depending upon the use.

In the pretreatment system for wheat to be floured shown in FIGS. 1-6, the front half 116 of the wheat grain polishing process line comprise the first friction type wheat polishing machine 10 having associated therewith the moisture supplying device 100, and the second friction type wheat polishing machine 10. With such an arrangement, the moisture is added directly to the wheat grains flowing through the polishing chamber 21 of the first friction type wheat polishing machine 10, to facilitate the stripping of the pericarp from each wheat grain. Since the moisture added is discharged out of the polishing chamber 21 together with the stripped bran powder for a short time until the wheat grains reach the discharge passage 36, the moisture would not substantially affect the endosperm part of each wheat grain. Accordingly, should the density of the wheat grains within the respective polishing chambers 21 and 21 of the first and second friction type wheat polishing machines 10 and 10 be maintained at a high level, the load required for the stripping-off of the pericarp softened by the added moisture, from each wheat grain would not be sufficient to cause the stripping-off action to be affected against the endosperm part of each wheat grain, and the yield of products would not be reduced. The stripping-off of the pericarp from each wheat grain as it is left as a coarse particle makes the stripping-off action efficient, and satisfies the requirement that the stripped bran powder be desired to be coarse particles when the bran powder is utilized in other use. The use of the bran powder consisting of an intermediate layer portion between the pericarp and the endosperm part of each wheat grain requires, because of components contained in the bran, that the bran powder be fine. In view of the requirements, the first and second grinding type wheat polishing machines 60 and 60 are inserted in an intermediate step of the wheat polishing process line for grinding the pericarp layer of each wheat grain surface into fine particles. In addition, the friction type wheat polishing machine 10 having associated therewith the moisture supplying device 100 is arranged at the final or last step of the wheat polishing process line thereby permitting the bran powder floatingly adhering to each wheat grain surface and the pericarp layer slightly remaining on the wheat grain surface to be removed from each grain in a substantially complete manner. Thus, the rear half 117 of the wheat polishing process line which is formed by the first and second grinding type wheat polishing machines 60 and 60 and the last friction type wheat polishing machine 10 having associated therewith the moisture supplying device 100 enables the wheat grains, off which the bran powder is substantially completely swept and the pericarp layers are substantially completely stripped to expose the endosperm parts, to be supplied to a subsequent milling process line to be described later to thereby permitting high quality wheat flour having no impurities adhering to or mixed with the endosperm parts, to be produced at a high yield.

The polishing roll 77 may be dispensed with in the grinding type wheat polishing machine 60 described in conjunction with FIGS. 5 and 6.

Figure 7:
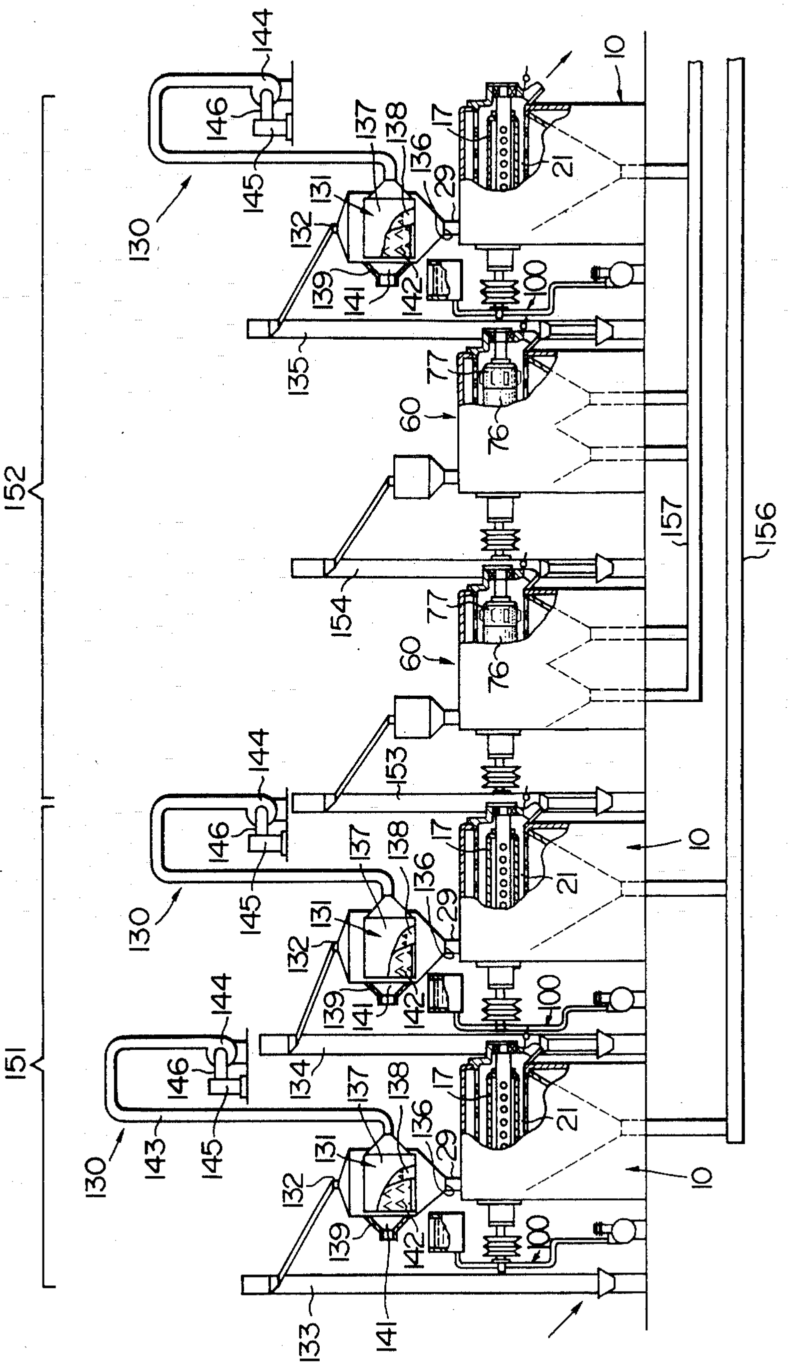
FIG. 7 is a schematic view showing a second embodiment of the pretreatment system in accordance with the present invention, which has incorporated therein a humidifying device.

FIG. 7 shows a second embodiment of the pretreatment system in accordance with the present invention in which a humidifying device is additionally provided for humidifying the surface of each wheat grain to be introduced into the polishing chamber 21 of at least one of the plurality of friction type wheat polishing machines 10 in the system shown in FIG. 1. In the embodiment shown in FIG. 7, the humidifying device generally designated by the reference numeral 130 is associated with each of the friction type wheat polishing machines 10. As to the detailed construction of the humidifying device 130, reference should be made to U.S. Pat. No. 4,488,481.

The humidifying device 130 comprises a vessel 131 in substitution for the hopper 33 shown in FIG. 2. The vessel 131 has an inlet 132 connected to a corresponding elevator 133, 134, 135 for receiving the wheat grains to be polished and an outlet 136 connected to the inlet duct 29 of the friction type wheat polishing machine 10. The vessel 131 defines therein a delivery passage extending between the inlet 132 and the outlet 136. A side cover 137 cooperates with a side wall of the vessel 131 to define therebetween a supply chamber 138, and a side cover 139 cooperates with the opposite side wall of the vessel 131 to define therebetween a discharge chamber 141. A plurality of flow fed members 142 extend across the delivery passage within the vessel 131, and each flow bed member 142 has a generally inverted V-shaped cross-section. The flow bed members 142 are arranged in a plurality of rows and in spaced parallel relation to each other. The flow bed members 142 in one of the adjacent upper and lower rows are arranged in staggered relation to the flow bed members 142 of the other row. Each of the flow bed members 142 in every other rows has closed longitudinal one end and the other longitudinal end communicating with the supply chamber 138, and each of the flow bed members 142 in the remaining rows has one closed longitudinal end and the other longitudinal end communicating with the discharge chamber 141. Gaps between the adjacent flow bed members 142 define the above-described delivery passage. A duct 143 is connected at one end thereof to the supply chamber 138 and at the other end to a discharge port of a blower 144. An atomizing unit 145 provided with a supersonic vibrating element is connected to a suction port of the blower 144 through a duct 146.

With the arrangement described above, the surface of each wheat grain introduced into the vessel 131 of the humidifying device 130 by the elevator 133 and flowing along the delivery passage within the vessel is brought into contact with humidifying air supplied into the vessel 131 from the atomizing unit 145 by the blower 144 through the duct 143, the supply chamber 138 and some of the flow bed members 142, so that each wheat grain surface is humidified. The air after having humidified the wheat grains is discharged out of the vessel 131 through the remaining flow bed members 142 and the discharge chamber 141. The surface of each wheat grain is humidified to the extent that the endosperm part of each wheat grain is not affected. The humidified wheat grains are supplied into the first friction type wheat polishing machine 10 having associated therewith the moisture supplying device 100. The moisture supplying device 100 supplies moisture directly into the polishing chamber 21 of the first friction type wheat polishing machine 10 to add the moisture to the wheat grains flowing through the polishing chamber 21 thereby increasing a frictional contact force between the wheat grains. The rotation of the frictionally polishing roll 17 causes the wheat grains to be brought into frictional contact with each other to soften the thin pericarp layer of each wheat grain, to thereby facilitate the stripping of the pericarp from each wheat grain. The wheat grains discharged from the first friction type wheat polishing machine 10 is introduced, by he elevator 134, into the subsequent humidifying device 130 and the second friction type wheat polishing machine 10 having associated therewith the moisture supplying device 100, in which a treatment similar to that described previously is repeated. The first and second friction type wheat polishing machines 10 and 10 form a front half 151 of the continuous wheat polishing process line. The wheat grains discharged from the front half 151 of the wheat polishing line are successively introduced into the first and second grinding type wheat polishing machines 60 and 60 through elevators 153 and 154, respectively. A pericarp is stripped off from each wheat grain by the first and second grinding type wheat polishing machines 60 and 60 in a manner substantially similar to that described in conjunction with FIGS. 5 and 6, such that the wheat grain has a desired polishing degree. Subsequently, the wheat grains are introduced into the vessel 131 of the third humidifying device 130 by the elevator 135. The wheat grains supplied into the third humidifying device 130 are humidified to the extent that the moisture applied thereto acts only upon the pericarp layers slightly remaining on the wheat grains. Subsequently, the humidified wheat grains are introduced into the third or the last friction type wheat polishing machine 10. By the addition of the moisture from the moisture supplying device 100 associated with the last friction type wheat polishing machine 10 and by the rotation of the frictionally polishing roll 17, bran powder is substantially completely swept away from the wheat grain and the pericarp layer slightly remaining on each wheat grain is substantially completely stripped off therefrom and, subsequently, the wheat grains are discharged out of the last friction type wheat polishing machine 10. The thus discharged wheat grains are transported to a subsequent milling step. In the embodiment shown in FIG. 7, since each of the humidifying devices 130 performs the humidification of such a degree as to act only on the pericarp layer portion of each wheat grain which is to be stripped off therefrom the corresponding friction type wheat polishing machine 10 having associated therewith the moisture supplying device 100, the load applied to the respective friction type wheat polishing machines 10 can be reduced, and the stripping-off of the pericarp layer from each wheat grain can be given uniformly over the entire wheat grain surface. Similarly to the embodiment shown in FIG. 1, the bran powder discharged from the front half 151 of the wheat polishing process line is transported to any desired place through a pneumatic transporting tube 156, and the bran powder discharged from the rear half 152 is transported to another any desired place through a pneumatic transporting tube 157.

Figure 8:
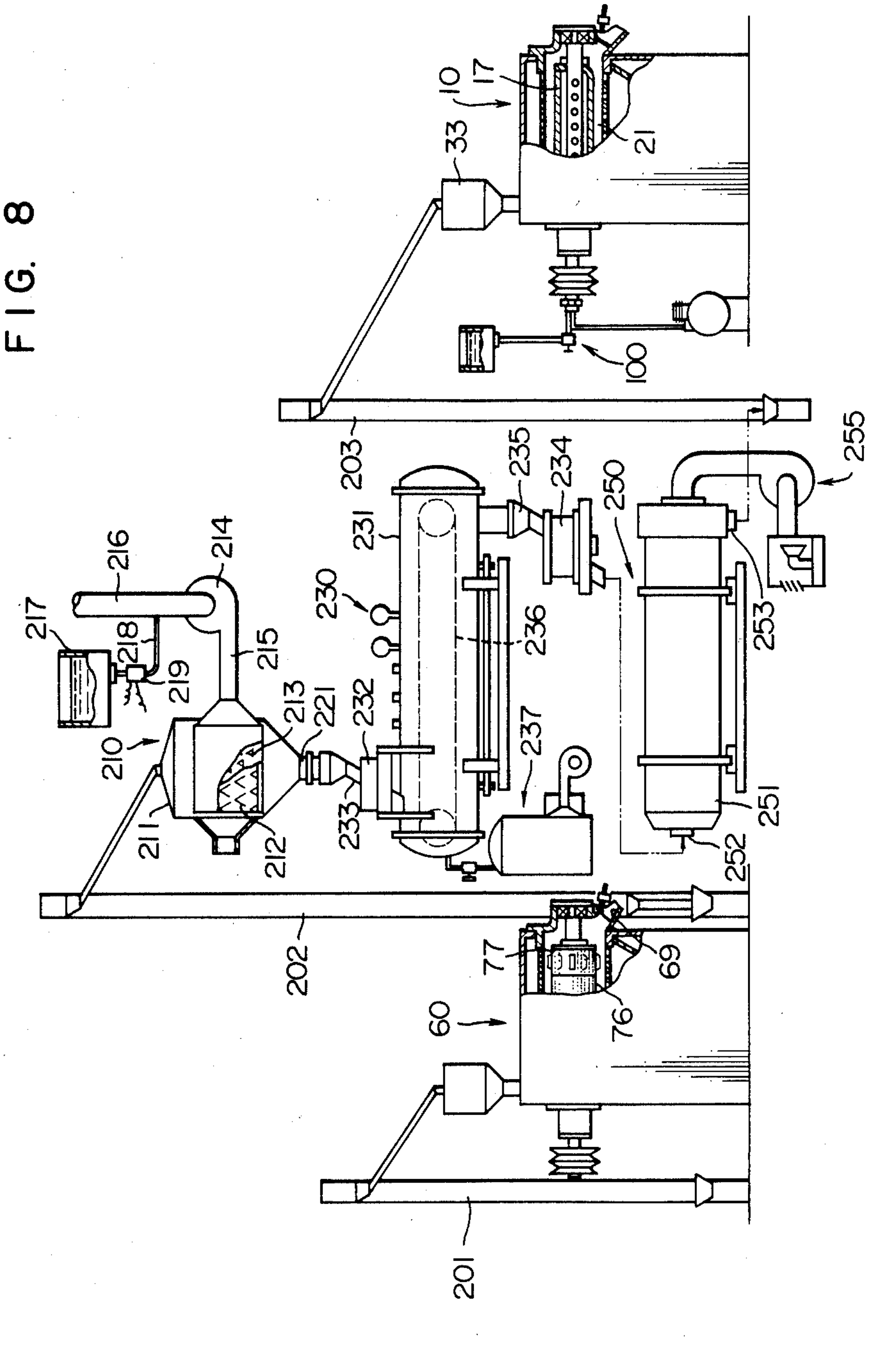
FIG. 8 is a schematic fragmentary view of a third embodiment of the pretreatment system in accordance with the present invention, which has incorporated therein a humidifying device, a heating device and a drying device.

FIG. 8 shows a third embodiment of the pretreatment system according to the present invention, which additionally comprises a humidifying device for humidifying the surface of each wheat grain to be introduced into the polishing chamber 21 of at least one of the plurality of friction type wheat polishing machines 10 shown in FIG. 1 (only one being shown in FIG. 8), a heating device for heating the wheat grains humidified by the humidifying device and a drying device for drying the wheat grains heated by the heating device. In FIG. 8, the humidifying device is generally designated by the reference numeral 210, the heating device is generally designated by the reference numeral 230, and the drying device is generally designated by the reference numeral 250.

The humidifying device 210 comprises a vessel 211 which is similar in construction to the vessel 131 of the humidifying device 130 shown in FIG. 7 and in which a plurality of flow bed members 212 are incorporated. An inlet of the vessel 211 communicates with the discharge passage 69 of the grinding type wheat polishing machine 60 through an elevator 202. A supply chamber 213 is connected to a discharge port of a blower 214 through a duct 215. A duct 216 is connected to a suction port of the blower 214. A water tank 217 is connected to the duct 216 through a pipe 218 having provided therein an electromagnetic valve 219, so that the water is supplied in the air passing through the duct 216.

The heating device 230 comprises a vessel 231 which is held in gas tight by a rotary valve 232 provided in an inlet duct 233 connected to the outlet 221 of the vessel 211 of the humidifying device 210 and a rotary valve 234 provided in an outlet duct 235. A net conveyer 236 disposed within the vessel 231 delivers wheat grains from the inlet duct 233 to the outlet duct 235. A boiler 237 is connected to the vessel 231 for supplying heated steam thereinto, to thereby allow the heated steam to be applied to the wheat grains being delivered by the net conveyor 236.

The drying device 250 comprises a vessel 251 which has an inlet 252 connected to the outlet duct 235 of the vessel 231 of the heating device 230 and an outlet 253 communicating with a hopper 33 of a friction type wheat polishing machine 10. A conveyor (not shown) disposed within the vessel 251 and similar to the conveyer 236 in the heating device 230 delivers the wheat grains from the inlet 252 to the outlet 253. A dried air generator 255 is connected to the vessel 251 for supplying dried air thereinto, to thereby allow the dried air to be applied to the wheat grains being delivered by the conveyer.

Operation of the embodiment shown in FIG. 8 will be described. The wheat grains introduced into the grinding type wheat polishing machine 60 by the elevator 201 are polished, in a manner similar to that described with reference to the embodiment shown in FIG. 1, by the grinding roll 76 and the grinding roll 77 of the polishing machine 60 so that pericarp of each wheat grain is removed therefrom to roughen the surface of each wheat grain thereby improving the moisture absorbability of the wheat grain. The wheat grains supplied to the humidifying device 210 by the elevator 202 are humidified by the moisture supplied into the vessel 211. The humidified wheat grains are supplied onto the net conveyor 236 through the rotary valve 232 provided in the inlet duct 233 of the heating device 230. The wheat grains on the net conveyor 236 are exposed to steam supplied from the boiler 237 so that the pericarp layers of the respective wheat grains are gelatinized. Subsequently, the wheat grains are introduced into the drying device 250 through the rotary valve 234 provided in the outlet duct 235, to apply dried air from the dried air generator 255 to the wheat grain surfaces to thereby cool and harden the same. The wheat grains flowing out of the drying device 250 are introduced by the elevator 203 into the friction type wheat polishing machine 10 having associated therewith the moisture supplying device 100, within a short period of time during which the heating effect is not affected to the endosperm part of each wheat grain. By the mutual frictional action between the wheat grains due to the frictionally polishing roll 17 of the friction type wheat polishing machine 10 and by the moisture addition due to the moisture supplying device 100, an intermediate pericarp layer portion between the surface and endosperm part of each wheat grain is softened to facilitate the stripping-off of the thus softened intermediate pericarp layer portion from the wheat grain, to thereby enable the polishing efficiency to be improved. Should a continuous wheat polishing process line be formed by the disposition in series relation of a plurality of wheat polishing steps constituted by friction type wheat polishing machines 10 each having associated therewith the humidifying device 210, the heating device 230, the drying device 250 and the moisture supplying device 100, then the used number of the wheat polishing machines 10 and/or 60 would be able to be reduced.

Figure 9:
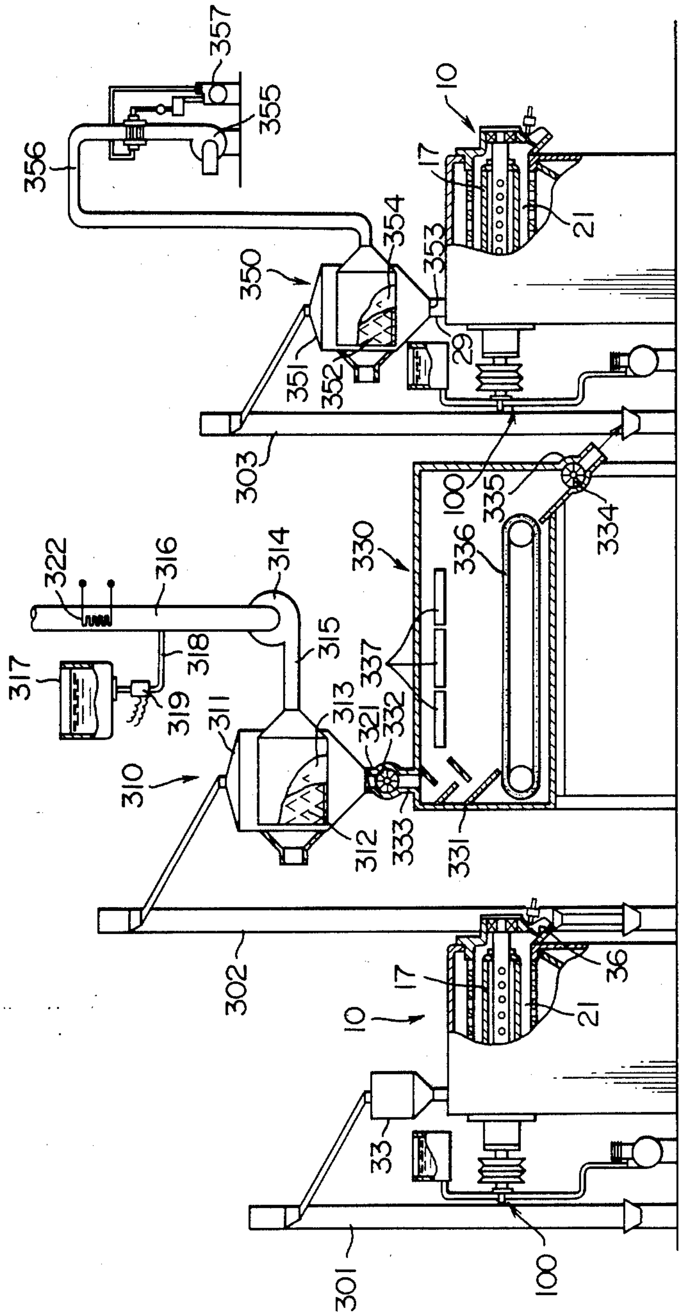
FIG. 9 is a schematic fragmentary view of a fourth embodiment of the pretreatment system in accordance with the present invention, which has incorporated therein a humidifying device, a heating device and a cooling d device.

FIG. 9 shows a fourth embodiment of the pretreatment system according to the present invention, which additionally comprises a humidifying device for humidifying the surface of each wheat grain to be introduced into the polishing chamber 21 of at least one of the plurality of friction type wheat polishing machines 10 in the system shown in FIG. 1, a heating device for heating the wheat grains humidified by the humidifying device and a cooling device for cooling the wheat grains heated by the heating device. In FIG. 9, the humidifying device is generally designated by the reference numeral 310, the heating device is generally designated by the reference numeral 330, and the cooling device is generally designated by the reference numeral 350.

The humidifying device 310 is similar in construction to the humidifying device 210 shown in FIG. 8 and in which a plurality of flow bed members 312 are incorporated. An inlet of the vessel 311 communicates with the discharge passage 36 of the friction type wheat polishing machine 10 through an elevator 302. A supply chamber 313 is connected to a discharge port of a blower 314 through a duct 315. A duct 316 having provided therein a resistance type heater 322 is connected to a suction port of the blower 314. A water tank 317 is connected to the duct 316 through a tube 318 in which an electromagnetic valve 319 is provided, so that water is supplied into the air passing through the duct 316 and heated by the heater 322.

The heating device 330 comprises a vessel 331 which includes an inlet duct 333 connected to the outlet 321 of the vessel 311 of the humidifying device 310 and having a rotary valve 332 provided in the inlet duct 333, and an outlet duct 335 having provided therein a rotary valve 334. A belt conveyor 336 arranged within the vessel 331 delivers the wheat grains from the inlet duct 333 to the outlet duct 335. A plurality of high frequency heaters 337 arranged within the vessel 331 heat the wheat grains being delivered by the conveyor 336.

The cooling device 350 has a vessel 351 substituted for the hopper 33 of the friction type wheat polishing machine 10 shown in FIG. 2. The vessel 351 is similar in construction to the vessel 131 of the humidifying device 130 shown in FIG. 7, and a plurality of flow bed members 352 are incorporated within the vessel 315. An inlet of the vessel 315 communicates with the outlet duct 335 of the heating device 330 through an elevator 303. An outlet 353 of the vessel 351 is connected to the inlet duct 29 of the friction type wheat polishing machine 10. A supply chamber 354 is connected to a discharge port of a blower 355 through a duct 356. A cooler unit 357 cools air flowing through the duct 356.

In the embodiment shown in FIG. 9, the wheat grains are supplied to the polishing chamber 21 of the friction type wheat polishing machine 10 having associated therewith the moisture supplying device 100. The moisture supplying device 100 supplies moisture into the polishing chamber 21 to directly add the moisture to the wheat grains therewithin. The rotation of the frictionally polishing roll 17 causes the wheat grains to be brought into frictional contact with each other to soften the pericarp of each wheat grain and strip off the pericarp therefrom. The polished wheat grains are introduced into the vessel 311 of the humidifying device 310 through the elevator 302 and are subjected to the humidifying action due to the heated and humidified air supplied through the duct 315, so that the pericarp layer of each wheat grain is humidified. The humidified wheat grains are supplied onto the belt conveyor 336 of the heating device 330. The wheat grains on the conveyor 336 are heated by the high frequency heaters 337, and the pericarps thereof are gelatinized. Subsequently, the wheat grains are supplied form the heating device 330 to the cooling device 350 by the elevator 303 and are cooled by the cooler unit 357 while they flow down in the vessel 351, and the wheat grains are exposed to air supplied from the blower 355 into the vessel 351 so that the surface of each wheat grain is cooled and hardened. The cooled and hardened wheat grains are supplied to the friction type wheat polishing machine 10 with which the moisture supplying device 100 is associated. The moisture from the moisture supplying device 100 is applied to the wheat grains flowing in the polishing chamber 21 to thereby increase the frictional resistance between the wheat grains, and they are brought into frictional contact with each other by the agitation due to the frictionally polishing roll 17. Thus, the pericarp of each wheat grain which is gelatinized by the heating device 330 so as to have a hardness different from that of the endosperm part of the wheat grain is easily stripped therefrom. The insertion of the humidifying device 310, the heating device 330 and the cooling device 350 at appropriate positions in the wheat polishing process line makes it possible to reduce the used number of the friction type wheat polishing machines 10 and/or the grinding type wheat polishing machines 60 shown in FIG. 1. In addition, according to the embodiment shown in FIG. 9, since the pericarps of the wheat grains are efficiently stripped from the wheat grains without damaging the endosperm parts, the succeeding milling operation at a high yield can be secured.

Figure 10:
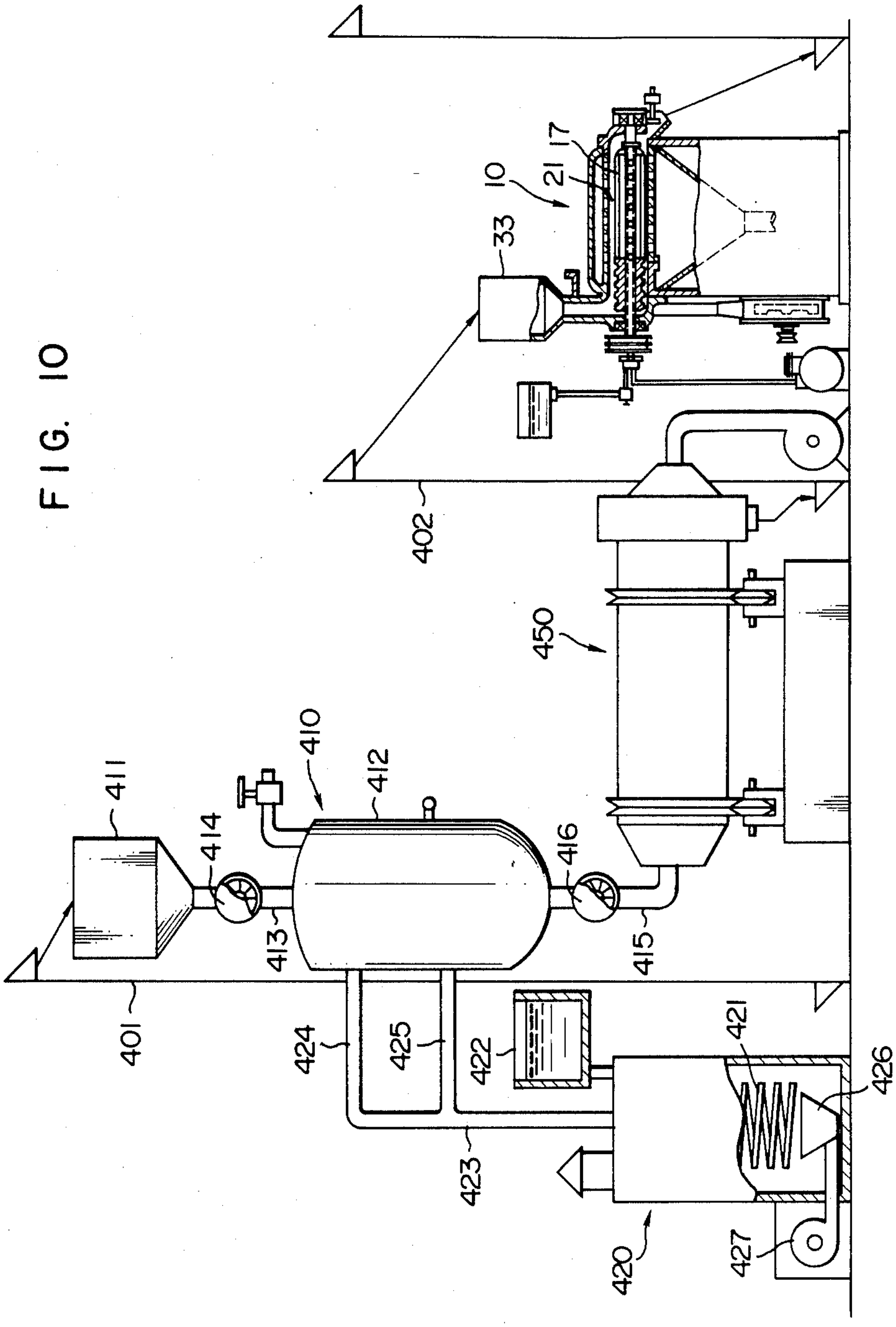
FIG. 10 is a schematic fragmentary view of a fifth embodiment of the pretreatment system in accordance with the present invention, which has incorporated therein a heating and humidifying device and a drying device.

FIG. 10 shows a fifth embodiment of the pretreatment system according to the present invention, which additionally comprises a humidifying and heating device for simultaneously humidifying and heating the surface of each wheat grain to be introduced into the polishing chamber 17 of at least one of the plurality of friction type wheat polishing machines 10 in the system shown in FIG. 1, and a drying device for drying the thus simultaneously humidified and heated wheat grains. In FIG. 10, the humidifying and heating device is generally designated by the reference numeral 410, and the drying device is generally designated by the reference numeral 450.

The humidifying and heating device 410 has a hopper 411 for receiving the wheat grains transported by an elevator 401. A vessel 412 has an inlet duct 413 connected to the hopper 411 and having provided therein a rotary valve 414, and an outlet duct 415 having provided therein a rotary valve 416. A boiler 420 comprises a helically wound heating tube 421 having one end thereof connected to a water tank 422 and other end connected to a duct 423. The duct 423 is connected to the vessel 412 by two branch ducts 424 and 425. Fuel is supplied to a burner 426 by a pump 427 so as to be burnt by the burner 426. Water flowing through the heating tube 421 is heated by the burner 426 to generate steam. The heated steam is introduced into the vessel 412 through the duct 423 and the branch ducts 424 and 425 to simultaneously humidify and heat the wheat grains within the vessel 412.

The drying device 450 is substantially similar in construction to the drying device 250 shown in FIG. 8 and, therefore, the description thereof will not be repeated here. The wheat grains dried by the drying device 450 are introduced into the hopper 33 of the friction type wheat polishing machine 10 by an elevator 402.

In the embodiment shown in FIG. 10, the interior of the vessel 412 is positively maintained at a high pressure by the provision of the rotary valves 414 and 416, and the steam is supplied from the boiler 420 to the wheat grains which flow within the vessel 412 with the inflow and outflow of the wheat grains being synchronized with each other, so that the pericarps of the wheat grains are heated and the surfaces thereof are gelatinized. Subsequently, the surface of each wheat grain is hardened by the drying device 450 and the hardened wheat grains are supplied to the friction type wheat polishing machine 10 of the subsequent step. Since the embodiment shown in FIG. 10 applies the humidifying and heating effect to the wheat grains with the interior of the vessel 412 being maintained at a high pressure, the gelatinization of the wheat grain pericarps due to the heating thereof is efficient thereby permitting the vessel 412 to be small-sized.

Figure 11:
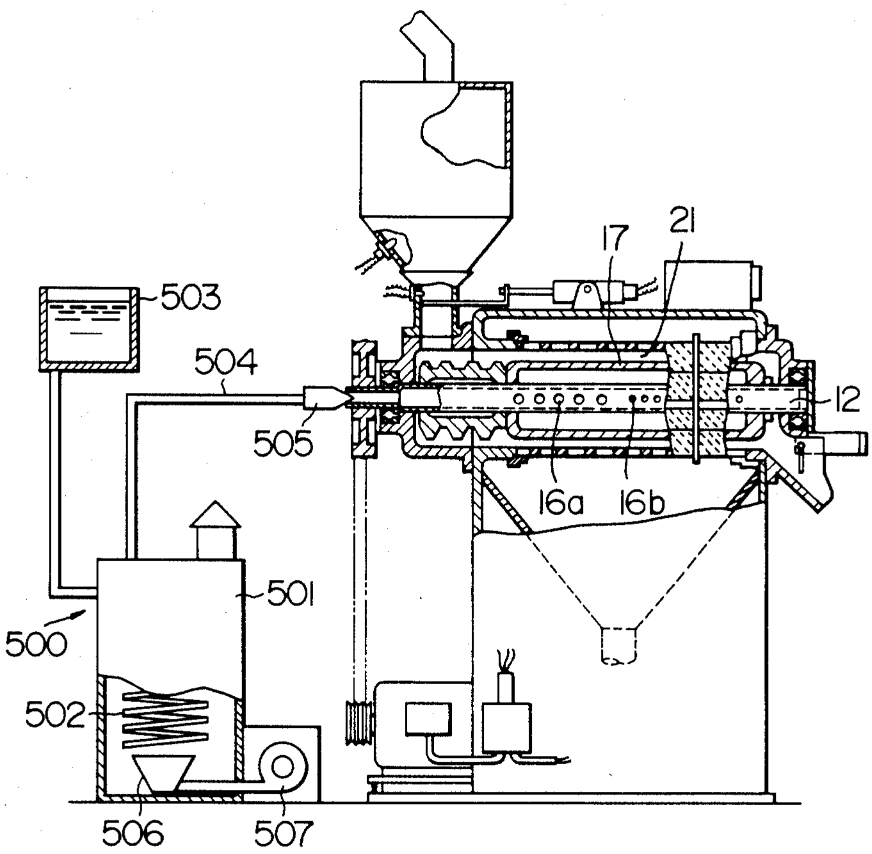
FIG. 11 is a partially cross-sectional, schematic view showing a modification of the moisture supplying device associated with the friction type wheat polishing machine.

FIG. 11 shows a modification of the moisture supplying device 100 shown in FIGS. 1 and 4. A moisture supplying device generally designated by the reference numeral 500 in FIG. 11 has a boiler 501 which comprises a helically wound heating tube 502 having one end thereof connected to a water tank 503 and the other end connected to a pipe 504. The pipe 504 is connected to a nozzle 505 which is directed toward the end face of the hollow shaft 12 of the friction type wheat polishing machine 10. Fuel is supplied to a burner 506 by a pump 507 so as to be burnt thereby. Water flowing through the heating tube 502 is heated by the burner 506 to generate steam. The heated steam flows through the tube 504 and injected from the nozzle 505 into the hollow portion of the hollow shaft 12. The heated steam injected into the hollow portion of the hollow shaft 12 is supplied to the polishing chamber 21 through the bores 16*a* and 16*b*, the hollow portion of the polishing roll 17 and the slots 18 (refer to FIG. 3).

With the combination arrangement of the moisture supplying device 500 and the friction type wheat polishing machine 10 shown in FIG. 11, since the wheat grains flowing through the polishing chamber 21 are directly supplied with the heated steam to thereby simultaneously humidify and heat the pericarps of the wheat grains, softening of the pericarps of the wheat grains can be expedited within a short time. The combination arrangement is effective in case where the humidifying device 130, 210, 310 or the heating device 230, 330, or the heating and humidifying device 410 is not inserted at any positions in the wheat polishing process line.

Figure 12:
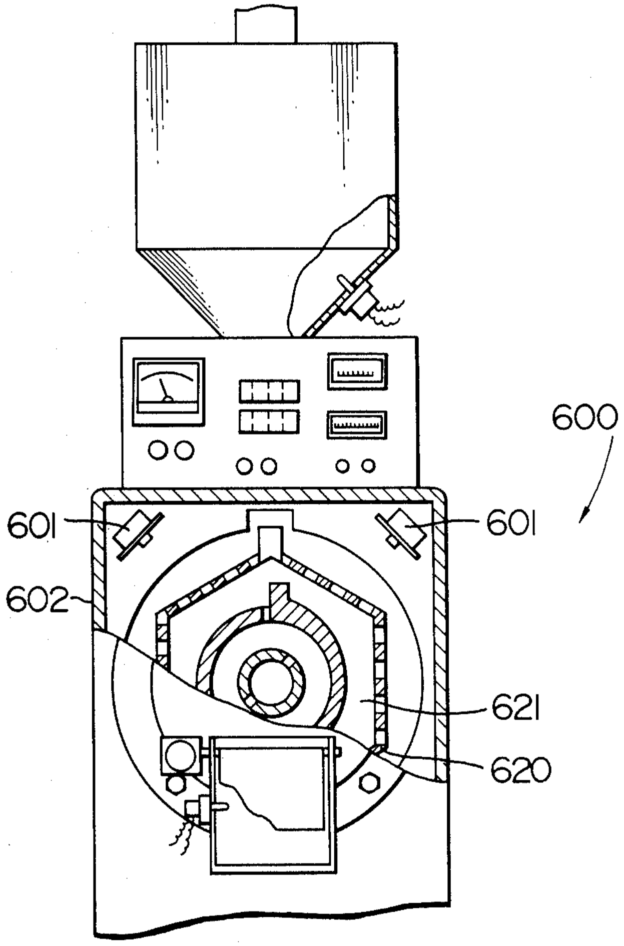
FIG. 12 is a view similar to FIG. 3, but showing a modification of the friction type wheat polishing machine, which has incorporated therein a heating device.

FIG. 12 shows a modification of the friction type wheat polishing machine 10 shown in FIG. 4 and having associated therewith the moisture supply device 100 or 500. A friction type wheat polishing machine generally designated by the reference numeral 600 in FIG. 12 is substantially similar in construction to the friction type wheat polishing machine 10 shown in FIGS. 2 and 3 except that it has a plurality of high frequency heaters 601 mounted within a frame 602 and, therefore, detailed description thereof will be omitted.

In the friction type wheat polishing machine 600 shown in FIG. 12, moisture is added to the wheat grains flowing through the polishing chamber 621 from the moisture supplying device 100 or 500 (not shown in FIG. 12), and the pericarps of the wheat grains to which the moisture is added are heated by the high frequency heaters 601 through apertures in a perforated tubular polishing member 620 to thereby soften the pericarps so that stripping of the pericarps from the wheat grains is facilitated. In the similar manner as that described in conjunction with FIG. 11, the friction type wheat polishing machine 600 shown in FIG. 12 and having associated therewith the moisture supplying device 100 or 500 is effective in case where the humidifying device or the heating device or the humidifying and heating device is not inserted at any positions in the wheat polishing process line.

The process line for the pretreatment of wheat to be floured should not be limited to the embodiments shown in FIGS. 1-10, inclusive. The pretreatment process line may comprise, depending upon kind, place of production and the like of the wheat, only a plurality of friction type wheat polishing machines 10; 600 having respectively associated therewith the moisture supplying device 100 or 500, or may comprise one or more friction type wheat polishing machines 10; 600 with each of which the moisture supplying device 100 or 500 is associated and friction type wheat polishing machines 10; 600 having associated therewith no moisture supplying device. Further, the number of the friction type wheat polishing machines 10; 600 and the number of the moisture supplying devices 100 or 500 may be appropriately set as desired.

In case where it is required to process or treat several kinds of wheat using the same installation, elevators in front of and in rear of each friction type wheat polishing machine may be directly connected to each other to form a bypass passage bypassing the polishing machine, and a switching valve may be provided between the front elevator and the bypass passage. In this case, the switching valve is movable between a position where the front elevator and the bypass passage communicate with each other and a position where the front elevator and the friction type wheat polishing machine communicate with each other, so as to form a wheat polishing process line suitably adapted for each kind of wheat.

Figure 13:
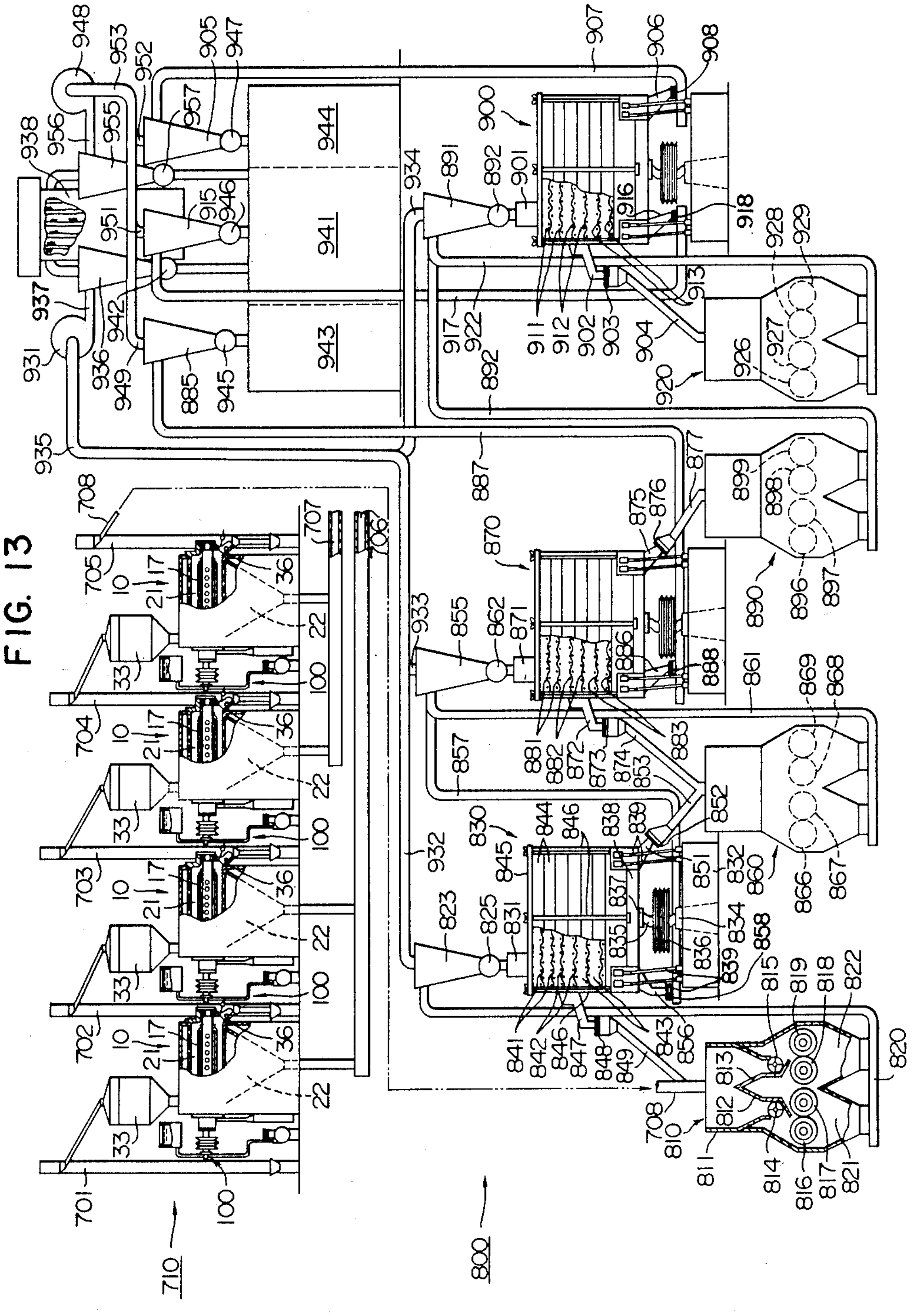
FIG. 13 is a partially cross-sectional, schematic view showing a system for carrying out a process for flouring wheat in accordance with an embodiment of the present invention.

FIG. 13 shows a wheat flouring system in accordance with an embodiment of the present invention, which comprises a pretreatment system generally designated by the reference numeral 710 and a milling and screening system generally designated by the reference numeral 800.

The pretreatment system 710 comprises a plurality of friction type wheat polishing machines 10 which are connected in series to each other similar to those described in conjunction with FIGS. 2 and 3, and a moisture supplying device 100 similar to that described in conjunction with FIG. 4 and associated with each of the friction type wheat polishing machines 10. It is of course that the pretreatment system 710 shown in FIG. 13 may comprise one or more grinding type wheat polishing machines 60 shown in FIGS. 5 and 6, in substitution for or in addition to one or more friction type wheat polishing machines 10 shown in FIG. 13; or may comprise at least one humidifying device 130 shown in FIG. 7 and associated with at least one of the friction type wheat polishing machines 10 shown in FIG. 13; or may comprise the humidifying device 210, the heating device 230 and the drying device 250 shown in FIG. 8 and incorporated in the pretreatment system 710 shown in FIG. 13; or may comprise the humidifying device 310, the heating device 330 and the cooling device 350 shown in FIG. 9 and incorporated in the pretreatment system 710 shown in FIG. 13; or may comprise the humidifying and heating device 410 and the drying device 450 shown in FIG. 10 and incorporated in the pretreatment system 710 shown in FIG. 13; or may comprise the moisture supplying device 500 shown in FIG. 11 in substitution for at least one of the moisture supplying device 100 shown in FIG. 13; or may comprise one or more friction type wheat polishing machines 600 shown in FIG. 12 in substitution for or in addition to at least one of the friction type wheat polishing machines 10 shown in FIG. 13.

An elevator 701 for supplying the wheat to be floured is connected to the hopper 33 of the first friction type wheat polishing machine 10. The second friction type wheat polishing machine 10, the third friction type wheat polishing machine 10 and the fourth friction type wheat polishing machine 10 are arranged in series, and adjacent friction type wheat polishing machines of each pair are connected by a corresponding elevator 702, 703, 704. Bran collecting ducts 22 and 22 of the respective first and second friction type wheat polishing machines 10 and 10 and bran collecting ducts 22 and 22 of the respective third and fourth friction type wheat polishing machines 10 and 10 are connected to one ends of respective pneumatic transporting lines 706 and 707, respectively, having their respective other ends connected to blowers (not shown), respectively.

The discharge passage 36 of the fourth, i.e., the last friction; type wheat polishing machine 10 of the pretreatment system 710 is connected to a first milling machine 810 of the milling and screening system 800 through an elevator 705 and a duct 708, to form a continuous milling process line comprising the wheat polishing process line and the milling and screening process line. The first milling machine 810 comprises a hopper 811 having two branching outlets 812 and 813. Rotary valves 814 and 815 each having a substantially horizontally extending axis are provided a the outlets 812 and 813 of the hopper 811, respectively, to control the flow rate of the wheat grains passing through the outlets 812 and 813, respectively. A pair of high-speed rotary roll 816 and low-speed rotary roll 817 are disposed at a position below he outlet 812 of the hopper 811, and are mounted on their respective horizontal driving shafts for rotation therewith so as to be rotated in the directions opposite to each other, respectively. A pair of high-speed rotary roll 818 and low-speed rotary roll 819 respectively similar to the rolls 816 and 817 are disposed at a position below another outlet 813 of the hopper 811.

The two pairs of roll 816 and 817 and 818 and 819 crush or mill the wheat grains fed from the respective outlets 812 and 813 to form a powder material.

The powder material from the pair of rolls 816 and 817 and the powder material from the pair of rolls 818 and 819 are introduced into one end of a common pneumatic transporting line 820 through two ducts 821 and 822 of the first milling machine 810, respectively. The pneumatic transporting line 820 has the other end connected to a cyclone 823 to transport the powder material from the milling machine 810 to the cyclone 823.

The bottom of the cyclone 823 is connected to an inlet 831 of a first screening machine 830 through an air-locking rotary valve 825. The first screening machine 830 comprises a base 832 and a bearing sleeve 834 extending from the lower surface of the base 832 to a position above the upper surface of the base 832. A crank shaft 835 on which a pulley 836 is fixedly mounted for rotation therewith has a lower end rotatably supported in the bearing sleeve 834 and an upper end rotatably supported in a bearing sleeve 837 fixedly secured to the lower surface of a swingable frame 838. The swingable frame 838 is supported on the upper surface of the base 832 by a plurality of supporting rods 839 each having an upper end connected to a universal joint and a lower end connected to a universal joint. An upper group of a plurality of screens 841 each having a relatively coarse mesh is mounted on the swingable frame 838 for angular or swinging movement therewith. An intermediate group of a plurality of screens 842 each having a finer mesh than the upper group of screens 841 is mounted on the swingable frame 838 for swinging movement therewith. A lower group of a plurality of screens 843 each having a finer mesh than the intermediate group of screen 842 is mounted on the swingable frame 838 for swinging movement therewith. Box frames 844 each having attached thereto corresponding one of the plurality of screens 841, 842 and 843 are stacked upon each other on the swingable frame 838, and are secured to the swingable frame 838, and are secured to the swingable frame 838 by a top pressing plate member 845 and pressing rods 846.

The powder material having a relatively coarse grain size and remaining on the upper group of screens 841 of the first screening machine 830 is introduced into the duct 708 through a duct 847, a bellows 848 and a duct 849, and is again milled by the rolls 816, 817, 818 and 819. The powder material remaining on the intermediate and lower groups of screens 842 and 843 of the first screening machine 830 and having a finer grain size than the powder material introduced into the duct 708 is supplied to a second milling machine 860 through a duct 851, a bellows 852 and a duct 853. The powder material having passed through the lower group of screens 843 and having a finer grain size than the powder material introduced into the duct 851 is supplied to a cyclone 855 through a duct 856, bellows 858 and a pneumatic transporting line 857.

The second milling machine 860 is similar in construction to the first milling machine 810 except that each pair of rotary rolls 866 and 867, 868 and 869 of the second milling machine 860 have a narrower gap than that between corresponding each pair of rolls 816 and 817, 818 and 819 of the first milling machine 810, that each roll 866, 867, 868, 869 of the second milling machine 860 has a smoother surface roughness (higher mesh) than the corresponding roll 816, 817, 818, 819 of the first milling machine 810, and so on. In other respects, the second milling machine 860 is substantially similar to the first milling machine 810 and, therefore, no description thereof will be repeated here. The material having been milled by the second milling machine 860 is introduced into the cyclone 855 through a pneumatic transporting line 861.

The powder material separated from air by the cyclone 855 is introduced into the inlet 871 of a second screening machine 870 through a rotary valve 862 similar to the rotary valve 825. The second screening machine 870 is similar in construction to the first screening machine 830 except that an upper group of screens 881 of the second screening machine 870 have a finer mesh than the lower group of screens 843 of the first screening machine 830, an intermediate group of screens 882 of the second screening machine 870 have a finer mesh than the upper group of screens 881, and a lower group of screens 883 of the second screening machine 870 have a finer mesh than the intermediate group of screens 882. In other respects, the second screening machine 870 is substantially similar to the first screening machine 830 and, therefore, no further description will be repeated here.

The powder material remaining on the upper group of screens 881 of the second screening machine 870 is introduced into the duct 853 through a duct 872, a bellows 873 and a duct 874, and is further milled by rolls 866, 867, 868 and 869. The powder material remaining on the intermediate and lower groups of screens 882 and 883 of the second screening machine 870 is supplied to a third milling machine 890 through a duct 875, a bellows 876 and a duct 877. The powder material having passed through the lower group of screens 883 is introduced into a cyclone 885 through a duct 886, a bellows 888 and a pneumatic transporting line 887.

The third milling machine 890 is similar in construction to the second milling machine 860 except that each pair of rolls 896 and 897, 898 and 899 of the third milling machine 890 have a narrower gap therebetween than the gap between a corresponding pair of the rolls 866 and 867, 868 and 869 of the second milling machine 860, each roll 896, 897, 898, 899 of the third milling machine 890 has a smoother surface roughness (higher mesh) than that of a corresponding roll 866, 867, 868, 869 of the second milling machine 860, and the like. In other respects, the third milling machine 890 is substantially identical with the second milling machine 860 and, therefore, no further description will be repeated here. The material having been milled by the third milling machine 890 is introduced into a cyclone 891 through a pneumatic transporting line 892.

The powder material separated from the air flow by the cyclone 891 is introduced into an inlet 901 of a third screening machine 900 through a rotary valve 892 similar to the rotary valve 825. The third screening machine 900 is similar in construction to the second screening machine 870 except that an upper group of screens 911 of the third screening machine 900 have the same mesh as that of the lower group of screens 883 of the second screening machine 870, an intermediate group of screens 912 of the third screening machine 900 have a finer mesh than the upper group of screens 911, and a lower group of screens 913 of the third screening machine 900 have a finer mesh than that of the intermediate group of screens 912. In other respects, the third screening machine 900 is substantially identical with the second screening machine 870.

The powder material remaining on the upper group of screens 911 of the third screening machine 900 is introduced into a fourth milling machine 920 through a duct 902, a bellows 903 and a duct 904. The powder material remaining on the intermediate and lower groups of screens 912 and 913 of the third screening machine 900 is introduced into a cyclone 905 through a duct 906, a bellows 908 and a pneumatic transporting line 907. The powder material having passed through the lower group of screens 913 of the third screening machine 900 is introduced into a cyclone 915 through a duct 916, a bellows 918 and a pneumatic transporting line 917.

The fourth milling machine 920 is similar in construction to the third milling machine 890 except that each pair of rolls 926 and 927, 928 and 929 of the fourth milling machine 920 have a narrow gap than that between a corresponding pair of rolls 896 and 897, 898 and 899, each roll 926, 927, 928, 929 of the fourth milling machine 920 has a smoother surface roughness (higher mesh) than a corresponding roll 896, 897, 898, 899 of the third milling machine 890, and the like. In other respects, the fourth milling machine 920 is substantially similar to the third milling machine 890. The material having been milled by the fourth milling machine 920 is introduced into the cyclone 891 through a pneumatic transporting line 922.

The tops of the respective cyclones 823, 855 and 891 are connected to a suction port of a turbofan 931 through respective ducts 932, 933 and 934 and a common duct 935. A discharge port of the turbofan 931 is connected to a cyclone 936 through a duct 937. The cyclone 936 has a top connected to a bag filter unit 938 and a bottom connected to a fine powder receiving container 941 through a rotary valve 942.

The cyclones 885, 915 and 905 have their respective bottoms respectively connected to fine powder receiving containers 943, 941 and 944 through rotary valves 945, 946 and 946, and their respective tops respectively connected to a suction port of a turbofan 948 through respective ducts 949, 951 and 952 and a common duct 953. A discharge port of the turbofan 948 is connected to a cyclone 955 through a duct 956. The cyclone 955 has a bottom connected to the fine powder receiving container 941 through a rotary valve 957 and a top connected to the bag filter unit 938.

Operation of the flouring system shown in FIG. 13 will be described below.

Wheat grains to be floured are successively polished by the first to fourth friction type wheat polishing machines 10 each having associated therewith the moisture supplying device 100, in a manner substantially identical with that described above with reference to FIGS. 1 through 6, so that a pericarp layer of each wheat grain is removed therefrom to expose the endosperm part thereof. Bran powder collected in the respective ducts 22 and 22 of the first and second friction type wheat polishing machines 10 and 10 is transported through the pneumatic transporting line 706, and bran powder collected in the respective ducts 22 and 22 of the third and fourth friction type wheat polishing machines 10 and 10 is transported through the pneumatic transporting line 707.

The wheat grains having their endosperm parts exposed are supplied from the pretreatment system 710 to the hopper 811 of the first milling machine 810 of the milling and screening process line 800 through the duct 708. The wheat grains supplied to the hopper 811 are equally discharged through the rotary valves 814 and 815. The wheat grains supplied to the high-speed rotary roll 816 and the low-speed rotary roll 817 through the rotary valve 814 enter the nip between the rolls 816 and 817 rotating in the opposite directions at different speeds from each other and are crushed or milled to form the powder material. Similarly, the wheat grains from the rotary valve 815 are crushed or milled by the rolls 818 and 819 to form the powder material. The powder material failing in the ducts 821 and 822 is drawn by the turbofan 931 and is introduced into the cyclone 823 through the pneumatic transporting line 820. The cyclone 823 separates the powder material from the air flow, and the separated powder material is introduced into the first screening machine 830 through the rotary valve 825.

The powder material supplied to the first screening machine 830 flows on the upper group of screens 841 which are orbited in a substantially horizontal plane by the crank shaft 835. The powder material of a relatively large grain size remaining on the upper group of screens 841 is returned to the first milling machine 810 through the ducts 847 and 849 and the duct 708 and is again milled thereby. The powder material having passed through the upper group of screens 841 flows on the screens 842 of the intermediate group, and the powder material having passed through the intermediate group of screens 842 flows on the lower group of screens 843. The powder material having passed through the lower group of screens 843 is introduced into the cyclone 855 by the drawing action of the turbofan 931 through the duct 856 and the pneumatic transporting line 857. The powder material remaining on the intermediate and lower groups of screens 842 and 843 is supplied to the second milling machine 860 through the ducts 851 and 853.

The powder material supplied to the second milling machine 860 is further crushed and milled by the two pairs of rolls 866 and 867 and 868 and 869, so as to have a further smaller grain size. The powder material from the second milling machine 860 is introduced into the cyclone 855 through the pneumatic transporting line 861 by the drawing action of the turbofan 931. The cyclone 855 separates the powder material from the air flow. The separated powder material is supplied to the second screening machine 870 through the rotary valve 862, and is screened or sieved by the screening machine 870 depending upon the grain size. The powder material remaining on the upper group of screens 881 is returned to the second milling machine 860 through the ducts 872 and 874 and is again milled thereby. The fine powder having passed through the lower group of screens 883 is introduced into the cyclone 885 through the duct 886 and the pneumatic transporting line 887 by the drawing action of the turbofan 948. The powder material remaining on the intermediate and lower groups of screens 882 and 883 is supplied to the third milling machine 890 through the ducts 875 and 877.

The powder material supplied to the third milling machine 890 is crushed and milled by the two pairs of rolls 896 and 897 and 898 and 899 so as to have a further smaller grain size. The powder material from the third milling machine 890 is introduced into the cyclone 891 through the pneumatic transporting line 892 by the drawing action of the turbofan 931. The cyclone 891 separates the powder material from the air flow, the separated powder material is supplied to the third screening machine 900 through the rotary valve 892, and is screened or sieved depending upon the grain size by the third screening machine 900. The powder material remaining on the upper group of screens 911 is supplied to the fourth milling machine 920 through the ducts 902 and 904 and is further crushed or milled thereby to form fine powder. The fine powder from the fourth milling machine 920 is introduced into the cyclone 891 through the pneumatic transporting line 922 by the drawing action of the turbofan 931. The fine powder separated from the air flow by the cyclone 891 is again screened by the third screening machine 900. The fine powder having passed through the lower group of screens 913 is introduced into the cyclone 915 through the duct 916 and the pneumatic transporting line 917 by the drawing action of the turbofan 948. The fine powder remaining on the intermediate and lower groups of screens 912 and 913 is introduced into the cyclone 905 through the duct 906 and the pneumatic transporting line 907 by the drawing action of the turbofan 948.

The fine powder separated from the air flow by the cyclone 885 is fed to the vessel 943 through the rotary valve 945 and is temporarily stored therein as wheat flour. The fine powder separated form the air flow by the cyclone 915 is fed to the vessel 941 through the rotary valve 946 and is temporarily stored therein as wheat flour. The fine powder separated from the air flow by the cyclone 905 is fed to the vessel 944 through the rotary valve 947 and is temporarily sorted therein as wheat flour.

The air flows from the respective cyclones 823, 855 and 891 are introduced into the cyclone 936 by the turbofan 931. The cyclone 936 separates fine powder contained in the air flows from the respective cyclones 823, 855 and 891 therefrom, the separated fine powder is introduced into the vessel 941 through the rotary valve 942 as wheat flour. Similarly, the air flows from the respective cyclones 885, 915 and 905 are introduced into the cyclone 955 by the turbofan 948. The cyclone 955 separates fine powder contained in the air flows from the respective cyclones 885, 915 and 905 therefrom. The separated fine powder is introduced into the vessel 941 through the rotary valve 957 as wheat flour. The air flows from the respective cyclones 936 and 955 are introduced into the bag filter unit 938 so that fine powder is substantially completely separated from the air, to thereby form clean air. The clean air is discharged from the bag filter unit 938 to the environment.

In the above-described wheat flouring process line, since the wheat grains supplied to the first milling machine 810 have been subjected to the flouring pretreatment to expose the endosperm parts of the wheat grains, the efficiency for milling the wheat grains by one pass through the nip between each pair of rolls is improved, and attention would not be required to be drawn so as not to crush or break the gluten parts of the wheat grains as required in the conventional flouring processes discussed previously. Thus, according to the present invention, it is possible to reduce required number of the milling machines and screening machines, and it is possible to simplify the operation of the entire flouring system. Further, since the wheat grains are floured after the pericarp of each wheat grain is stripped therefrom to expose the endosperm part, it is possible to raise the purity of the produced wheat flour, and it is also possible to increase the yield of production.

As described above, the pretreatment system for flouring wheat according to the present invention comprises a plurality of friction type wheat polishing machines disposed in series relation to form a continuous wheat polishing process line, and a moisture supplying device communicating with a polishing chamber of at least one of the friction type wheat polishing machines for supplying moisture thereto. The moisture supplying device supplies the moisture into the polishing chamber of the friction type wheat polishing machine having associated therewith the moisture supplying device, to thereby add the moisture to the pericarp of each wheat grain within the polishing chamber within such a short period of time as not to allow the supplied moisture to affect the endosperm part of each wheat grain. Rotation of a polishing roll of the friction type wheat polishing machine having associated therewith the moisture supplying device causes the wheat grains to be brought into frictional contact with each other to strip the pericarp from each wheat grain, to thereby expose the endosperm part. The cooperation of the moisture adding action due to the moisture supplying device with the polishing action due to the polishing roll of the friction type wheat polishing machine having associated therewith the moisture supplying device, allows substantially only the pericarp to be stripped from each wheat grain to expose the endosperm part thereof substantially in a perfect or complete form.

The wheat flouring process and the system therefor mill row break the wheat grains having their respective endosperm parts exposed by the stripping of their respective pericarps due to the pretreatment, by means of at least one milling machine to form wheat flour. Accordingly, the thus formed wheat flour contains substantially no pericarps of the wheat grains to thereby permit wheat flour of a high quality to be produced. Further, since the endosperm parts of the wheat grains which are exposed in a substantially perfect or complete form is milled or broken to form the wheat flour, high yield is achieved.

What is claimed is:

1. A process of flouring wheat, comprising:

the step of preparing a plurality of friction type wheat polishing machines disposed in series relation to form a continuous wheat polishing process line, each of said polishing machines comprising a frame, perforated tubular polishing member mounted on said frame, a frictionally polishing roll rotatably mounted on said frame so as to have an axis substantially coincident with an axis of said perforated tubular polishing member, said polishing roll cooperating with said perforated tubular polishing member to define therebetween a polishing chamber, means for feeding the wheat to be polished into said polishing chamber, means for rotating said frictionally polishing roll relative to said perforated tubular polishing member, the rotation of said frictionally polishing roll relative to said perforated tubular polishing member causing the wheat grains fed into said polishing chamber to be agitated to cause the wheat grains to be brought into frictional contact with each other, to thereby strip a pericarp from each wheat grain to polish the same, and the polished wheat grains being allowed to be discharged out of said polishing chamber and the stripped pericarps being allowed to be discharged out of said polishing chamber through the apertures in said perforated tubular polishing member, the wheat grains discharged out of a polishing chamber of one of the plurality of friction type wheat polishing machines disposed in the series relation being introduced into a polishing chamber of a friction type wheat polishing machine disposed subsequent to said one friction type wheat polishing machine in the series relation;

the step, associated with at least one of said friction type wheat polishing machines, of supplying moisture into the polishing chamber of the friction type wheat polishing machine to add the moisture to the individual wheat grains flowing within the polishing chamber to increase a frictional contact force between the wheat grains, to thereby cause the frictional contact of the wheat grains with each other by the frictionally polishing roll of said at least one friction type wheat polishing machine to moisturize and soften the entire pericarp of each wheat grain, to facilitate the stripping of the pericarp from each wheat grain and the exposure of an endosperm part of each wheat grain;

the step of milling the wheat grains each having the endosperm part exposed, to form a powder material; and the step of screening the powder material provide a flour having a desired particle size.

2. A process as defined in claim 1, including the step of humidifying a surface of each wheat grain to be introduced into the polishing chamber of at least one of said plurality of friction type wheat polishing machines.

3. A process as defined in claim 1, including the steps of collecting the wheat grain pericarps discharged out of the polishing chamber of at least the first one of said plurality of friction type wheat polishing machines, and collecting the wheat grain pericarps discharged out of the polishing chamber of at least the last one of said plurality of friction type wheat polishing machines.

4. A process as defined in claim 2, including the step of heating the wheat grains humidified by said humidifying step to gelatinize each wheat grain surface.

5. A process as defined in claim 4, including the step of drying the wheat grains heated by said heating step to cool and harden each wheat grain heated by said heating step to cool and harden each wheat grain surface.

6. A process as defined in claim 4, including the step of cooling the wheat grains heated by said heating step to harden the wheat grains.

7. A process as defined in claim 1, including the step of simultaneously humidifying and heating a surface of each wheat grain to be supplied into the polishing chamber of at least one of said plurality of friction type wheat polishing machines, to gelatinize the surface of each wheat grain.

8. A process as defined in claim 7, including the step of drying the wheat grains simultaneously humidified and heated by said humidifying and heating step to harden each wheat grain surface.

9. A process as defined in claim 1, including the step of supplying heated steam into the polishing chamber of the friction type wheat polishing machine having associated therewith said moisture supplying step, to simultaneously humidify and heat the wheat grains flowing within the polishing chamber.

10. A process as defined in claim 1, including the step of heating the wheat grains flowing within the polishing chamber of the friction type wheat polishing machine having associated therewith said moisture supplying step.

11. Process of flouring wheat, comprising passing wheat grains through a series of successive polishing zones sufficient for recovering from the last zone of the series polished individual grains which are substantially free of their pericarp and which have their endosperm part exposed, manipulating the grains in each zone to cause the individual grains to be brought into frictional contact with each other for progressively stripping the pericarp from the individual grains in the successive zones and for polishing the individual grains, while supplying moisture to the individual grains in at least one of the zones to increase a frictional contact force between the grains and to moisturize and soften the entire pericarp of each grain for facilitating the stripping of the pericarp from each grain and the exposure of an endosperm part of each grain, removing the stripped pericarps from each respective zone in which they are stripped from the grains, while passing the grains from the same said respective zone to a subsequent zone of the series for continuing the stripping of the pericarps from the individual grains and the polishing of such grains until the pericarps have been substantially completely removed from each of the individual grains and each of the grains has the endosperm part exposed in the last zone, recovering from the last zone that grains which have their endosperm parts exposed and milling such recovered grains to form a powder material substantially completely free of pericarp material, and screening the powder material to provide a flour having a desired mesh size.

12. Process of claim 11 wherein the pericarps removed from at least the first and last zones of the series are collected.

13. Process of claim 11 wherein a surface of each grain to be passed into at least one of the zones is humidified prior to passing the grains into such zone.

14. Process of claim 13 wherein the humidified grains are heated to gelatinize the surface of each grain prior to passing the grains into such zone.

15. Process of claim 14 wherein the heated grains are dried to cool and harden each grain surface prior to passing the grains into such zone.

16. Process of claim 14 wherein the heated grains are cooled to harden the grains prior to passing the grains into such zone.

17. Process of claim 11 wherein a surface of each grain to be passed into at least one of the zones is simultaneously humidified and heated to gelatinize the surface of each grain prior to passing the grains into such zone.

18. Process of claim 17 wherein the simultaneously humidified and heated grains are dried to harden the surface of each grain prior to passing the grains into such zone.

19. Process of claim 11 wherein heated steam is supplied to the at least one zone to which said moisture is supplied for simultaneously humidifying and heating the grains in said at least one zone.

20. Process of claim 11 wherein the grains passing through the at least one zone to which said moisture is supplied are heated in said at least one zone to soften the pericarp of the individual grains to facilitate stripping thereof from the grains.

* * * * *

UNITED STATES PATENT AND TRADEMARK OFFICE

CERTIFICATE OF CORRECTION

PATENT NO. : 4,741,913

DATED : May 3, 1988

INVENTOR(S) : TOSHIHIKO SATAKE

It is certified that error appears in the above-identified patent and that said Letters Patent is hereby corrected as shown below:

Column 28, claim 11, line 41, delete "that" and substitute therefor --the--.

Signed and Sealed this

Eleventh Day of October, 1988

*Attest:*

DONALD J. QUIGG

*Attesting Officer*

*Commissioner of Patents and Trademarks*